United States Patent
Abedini et al.

(10) Patent No.: US 12,058,728 B2
(45) Date of Patent: Aug. 6, 2024

(54) RANDOM ACCESS PROCEDURE SELECTION BY AN INTEGRATED ACCESS AND BACKHAUL NODE

(71) Applicant: QUALCOMM Incorporated, San Diego, CA (US)

(72) Inventors: Navid Abedini, Basking Ridge, NJ (US); Wanshi Chen, San Diego, CA (US); Tao Luo, San Diego, CA (US); Xiaoxia Zhang, San Diego, CA (US); Luca Blessent, Whitehouse Station, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 101 days.

(21) Appl. No.: 17/320,665

(22) Filed: May 14, 2021

(65) Prior Publication Data
US 2021/0385858 A1 Dec. 9, 2021

Related U.S. Application Data

(60) Provisional application No. 63/034,859, filed on Jun. 4, 2020.

(51) Int. Cl.
*H04L 29/08* (2006.01)
*H04L 5/00* (2006.01)
(Continued)

(52) U.S. Cl.
CPC ......... *H04W 74/006* (2013.01); *H04W 24/10* (2013.01); *H04W 74/0833* (2013.01); *H04W 80/02* (2013.01)

(58) Field of Classification Search
None
See application file for complete search history.

(56) References Cited

U.S. PATENT DOCUMENTS

| 8,811,262 B2 * | 8/2014 | Chung | H04L 5/001 |
| | | | 370/315 |
| 9,876,589 B2 * | 1/2018 | Hahn | H04W 24/10 |
| (Continued) | | | |

FOREIGN PATENT DOCUMENTS

WO  WO-2019212297 A1  11/2019

OTHER PUBLICATIONS

International Search Report and Written Opinion—PCT/US2021/032764—ISA/EPO—Sep. 24, 2021.

*Primary Examiner* — Sithu Ko
(74) *Attorney, Agent, or Firm* — Holland & Hart LLP

(57) ABSTRACT

Methods, systems, and devices for wireless communications are described. A child node may communicate in an integrated access and backhaul (IAB) communications system with a parent node and the parent node may transmit system information to the child node that may indicate one or more random access channel (RACH) procedure configurations such as a user equipment (UE)-specific RACH procedure configuration and a wireless backhaul-specific (e.g., IAB-specific) RACH procedure configuration. The child node may be configured to utilize the UE-specific RACH procedure configuration or the IAB-specific RACH procedure configuration such as if the child node meets one or more conditions or upon receiving an indication from the parent node. The child node may determine to use the UE-specific RACH procedure configuration for communicating with the parent node and may perform a RACH procedure with the parent node in accordance with the UE-specific RACH procedure configuration.

28 Claims, 15 Drawing Sheets

(51) Int. Cl.
  *H04W 24/10* (2009.01)
  *H04W 74/00* (2009.01)
  *H04W 74/0833* (2024.01)
  *H04W 80/02* (2009.01)

(56) References Cited

U.S. PATENT DOCUMENTS

| | | | | |
|---|---|---|---|---|
| 10,212,585 | B2* | 2/2019 | Zhang | H04L 9/08 |
| 2010/0331031 | A1* | 12/2010 | Chen | H04W 24/10 455/509 |
| 2011/0319066 | A1* | 12/2011 | Chou | H04W 88/04 455/422.1 |
| 2013/0039314 | A1* | 2/2013 | Prateek | H04W 74/08 370/329 |
| 2015/0256319 | A1* | 9/2015 | Lahetkangas | H04B 7/2656 370/280 |
| 2016/0029245 | A1* | 1/2016 | Hong | H04W 28/0252 370/329 |
| 2016/0242193 | A1* | 8/2016 | Hong | H04B 7/2612 |
| 2018/0324864 | A1* | 11/2018 | Jung | H04W 74/002 |
| 2019/0104551 | A1* | 4/2019 | Deenoo | H04W 72/0453 |
| 2019/0116613 | A1* | 4/2019 | Abedini | H04W 74/02 |
| 2019/0230545 | A1* | 7/2019 | Liou | H04W 24/10 |
| 2019/0254074 | A1 | 8/2019 | Jeon et al. | |
| 2019/0280756 | A1* | 9/2019 | Fan | H04W 74/0833 |
| 2019/0312665 | A1* | 10/2019 | Jo | H04L 27/2607 |
| 2019/0320468 | A1* | 10/2019 | Svedman | H04W 74/02 |
| 2020/0059957 | A1 | 2/2020 | Pan et al. | |
| 2020/0107362 | A1* | 4/2020 | Qi | H04W 52/362 |
| 2020/0112995 | A1* | 4/2020 | Islam | H04B 7/0695 |
| 2020/0252847 | A1* | 8/2020 | Park | H04W 88/14 |
| 2020/0344809 | A1* | 10/2020 | Svedman | H04W 88/02 |
| 2020/0351892 | A1* | 11/2020 | Yi | H04L 5/0092 |
| 2020/0374942 | A1* | 11/2020 | Sivavakeesar | H04W 68/00 |
| 2021/0194571 | A1* | 6/2021 | Ma | H04B 7/2125 |
| 2021/0250884 | A1* | 8/2021 | Iyer | H04W 56/0045 |
| 2021/0251011 | A1 | 8/2021 | You et al. | |
| 2021/0321463 | A1* | 10/2021 | Wu | H04W 74/0891 |
| 2021/0345303 | A1* | 11/2021 | Ying | H04W 72/04 |
| 2021/0385858 | A1* | 12/2021 | Abedini | H04W 80/02 |
| 2021/0385868 | A1* | 12/2021 | Ying | H04W 74/0833 |
| 2022/0159772 | A1* | 5/2022 | Raghavan | H04L 5/0085 |
| 2022/0191934 | A1* | 6/2022 | Miao | H04W 74/0833 |

* cited by examiner

RANDOM ACCESS PROCEDURE SELECTION BY AN INTEGRATED ACCESS AND BACKHAUL NODE

CROSS REFERENCE

The present Application for Patent claims the benefit of U.S. Provisional Patent Application No. 63/034,859 by Abedini et al., entitled "RANDOM ACCESS PROCEDURE SELECTION BY AN INTEGRATED ACCESS AND BACKHAUL NODE," filed Jun. 4, 2020, assigned to the assignee hereof, and expressly incorporated by reference herein.

FIELD OF TECHNOLOGY

The following relates generally to wireless communications and more specifically to random access channel (RACH) procedure selection by an integrated access and backhaul (IAB) node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station, such as a parent integrated access and backhaul (IAB) node, may provide system information to at least child IAB nodes to enable the child nodes to communicate with the base station. The system information may include an indication of an IAB-specific random access channel (RACH) procedure configuration to be used by child IAB nodes. In some cases, the IAB-specific RACH procedure configuration is configured for static IAB nodes but the IAB node may be a mobile IAB node (e.g., IAB-mobile termination (MT)). As such, the IAB-specific RACH procedure configuration may result in unsuccessful RACH transmissions and may introduce latency into the system when used by a mobile IAB node.

SUMMARY

The described techniques relate to improved methods, systems, devices, and apparatuses that support random access channel (RACH) procedure selection by an integrated access and backhaul (IAB) node. Generally, the described techniques provide for improving RACH procedure performance and mitigating latency in a communications system by enabling a child node to determine which RACH procedure configuration to use, such as a user equipment (UE)-specific RACH procedure configuration or an IAB-specific RACH procedure configuration. A child node (e.g., an IAB node) may communicate in an IAB communications system with a parent node, such as a parent IAB node, base station, etc. and the parent node may transmit system information to the child node that may indicate RACH procedure information. The child node may receive, from the parent node, the system information that may indicate a UE-specific RACH procedure configuration and a wireless backhaul-specific (e.g., IAB-specific) RACH procedure configuration. The child node may be configured to utilize the UE-specific RACH procedure configuration or the IAB-specific RACH procedure configuration. In some cases, the child node may use the UE-specific RACH procedure configuration upon meeting one or more conditions or upon receiving an indication from the parent node. The child node may determine to use the UE-specific RACH procedure configuration for connection with the parent node via a RACH procedure and may perform the RACH procedure with the parent node in accordance with the UE-specific RACH procedure configuration.

A method of wireless communications at a first wireless node is described. The method may include receiving, from a parent base station, system information that indicates a UE-specific RACH procedure configuration and a wireless backhaul-specific RACH procedure configuration, where the first wireless node is a wireless backhaul node to the parent base station, determining to use the UE-specific RACH procedure configuration for communicating with the parent base station, and performing a RACH procedure with the parent base station in accordance with the UE-specific RACH procedure configuration.

An apparatus for wireless communications at a first wireless node is described. The apparatus may include a processor, memory coupled with the processor, and instructions stored in the memory. The instructions may be executable by the processor to cause the apparatus to receive, from a parent base station, system information that indicates a UE-specific RACH procedure configuration and a wireless backhaul-specific RACH procedure configuration, where the first wireless node is a wireless backhaul node to the parent base station, determine to use the UE-specific RACH procedure configuration for communicating with the parent base station, and perform a RACH procedure with the parent base station in accordance with the UE-specific RACH procedure configuration.

Another apparatus for wireless communications at a first wireless node is described. The apparatus may include means for receiving, from a parent base station, system information that indicates a UE-specific RACH procedure configuration and a wireless backhaul-specific RACH procedure configuration, where the first wireless node is a wireless backhaul node to the parent base station, determining to use the UE-specific RACH procedure configuration for communicating with the parent base station, and performing a RACH procedure with the parent base station in accordance with the UE-specific RACH procedure configuration.

A non-transitory computer-readable medium storing code for wireless communications at a first wireless node is described. The code may include instructions executable by a processor to receive, from a parent base station, system information that indicates a UE-specific RACH procedure configuration and a wireless backhaul-specific RACH procedure configuration, where the first wireless node is a wireless backhaul node to the parent base station, determine to use the UE-specific RACH procedure configuration for communicating with the parent base station, and perform a RACH procedure with the parent base station in accordance with the UE-specific RACH procedure configuration.

In some examples of the method, apparatuses, and non-transitory computer-readable medium described herein, determining to use the UE-specific RACH procedure configuration may include operations, features, means, or instructions for selecting the UE-specific RACH procedure configuration based on the first wireless node being a mobile wireless backhaul node.

In some examples of the method, apparatuses, and non-transitory computer-readable medium described herein, selecting the UE-specific RACH procedure configuration further may include operations, features, means, or instructions for determining that a next UE-specific RACH occasion occurs prior to a next wireless backhaul-specific RACH occasion, and selecting the UE-specific RACH procedure configuration based on the next UE-specific RACH occasion occurring before the next wireless backhaul-specific RACH occasion.

In some examples of the method, apparatuses, and non-transitory computer-readable medium described herein, determining to use the UE-specific RACH procedure configuration may include operations, features, means, or instructions for selecting the UE-specific RACH procedure configuration based on satisfaction of one or more measurement thresholds.

In some examples of the method, apparatuses, and non-transitory computer-readable medium described herein, selecting the UE-specific RACH procedure configuration further may include operations, features, means, or instructions for determining a reference signal receive power (RSRP) associated with communications with the parent base station, identifying that the determined RSRP exceeds a threshold RSRP from the one or more measurement thresholds, and selecting the UE-specific RACH procedure configuration based on the identifying.

In some examples of the method, apparatuses, and non-transitory computer-readable medium described herein, selecting the UE-specific RACH procedure configuration further may include operations, features, means, or instructions for determining a variation over time of an RSRP or a channel quality indicator (CQI) associated with communications with the parent base station, identifying that the determined variation exceeds a respective threshold RSRP variation or threshold CQI variation from the one or more measurement thresholds, and selecting the UE-specific RACH procedure configuration based on the identifying.

In some examples of the method, apparatuses, and non-transitory computer-readable medium described herein, selecting the UE-specific RACH procedure configuration further may include operations, features, means, or instructions for determining a round trip time (RTT) associated with communications with the parent base station, identifying that the determined RTT may be less than a threshold RTT from the one or more measurement thresholds, and selecting the UE-specific RACH procedure configuration based on the identifying.

In some examples of the method, apparatuses, and non-transitory computer-readable medium described herein, selecting the UE-specific RACH procedure configuration further may include operations, features, means, or instructions for determining a variation in RTT associated with communications with the parent base station, identifying that the determined variation RTT exceeds a threshold variation RTT from the one or more measurement thresholds, and selecting the UE-specific RACH procedure configuration based on the identifying.

In some examples of the method, apparatuses, and non-transitory computer-readable medium described herein, the one or more measurement thresholds may be different for different classes of wireless nodes, where the classes of wireless nodes includes a mobile wireless backhaul node, a static wireless backhaul node, a wide-area wireless backhaul node, and a local-area wireless backhaul node.

Some examples of the method, apparatuses, and non-transitory computer-readable medium described herein may further include operations, features, means, or instructions for receiving, from the parent base station, the one or more measurement thresholds via a system information block (SIB) transmission.

Some examples of the method, apparatuses, and non-transitory computer-readable medium described herein may further include operations, features, means, or instructions for receiving, from the parent base station, the one or more measurement thresholds via a unicast transmission, the unicast transmission including an F1 application protocol transmission, radio resource control (RRC) transmission, medium access control (MAC) control element (CE) transmission, downlink control information (DCI) transmission, or a combination thereof.

In some examples of the method, apparatuses, and non-transitory computer-readable medium described herein, determining to use the UE-specific RACH procedure configuration may include operations, features, means, or instructions for identifying that a quantity of RACH attempts using the wireless backhaul-specific RACH procedure configuration exceeds a threshold quantity of attempts, and selecting the UE-specific RACH procedure configuration based on the identifying.

Some examples of the method, apparatuses, and non-transitory computer-readable medium described herein may further include operations, features, means, or instructions for attempting to perform the RACH procedure with the parent base station in accordance with the UE-specific RACH procedure configuration, identifying that a quantity of RACH attempts using the UE-specific RACH procedure configuration exceeds a threshold quantity of attempts, and determining to switch from using the UE-specific RACH procedure configuration to using the wireless backhaul-specific RACH procedure configuration based on the identifying.

In some examples of the method, apparatuses, and non-transitory computer-readable medium described herein, determining to use the UE-specific RACH procedure configuration may include operations, features, means, or instructions for receiving signaling, from the parent base station, activating the UE-specific RACH procedure configuration for communicating with the parent base station.

In some examples of the method, apparatuses, and non-transitory computer-readable medium described herein, receiving the signaling activating the UE-specific RACH procedure configuration further may include operations, features, means, or instructions for receiving DCI, a MAC-CE, RRC signaling, or a combination thereof.

Some examples of the method, apparatuses, and non-transitory computer-readable medium described herein may further include operations, features, means, or instructions for transmitting, to the parent base station, a message requesting the UE-specific RACH procedure configuration be activated, where receipt of the signaling activating the UE-specific RACH procedure configuration may be based on the request.

In some examples of the method, apparatuses, and non-transitory computer-readable medium described herein, the request may be transmitted in an uplink control information (UCI) transmission, MAC-CE transmission, F1 application protocol transmission, or RRC transmission, or a combination thereof.

Some examples of the method, apparatuses, and non-transitory computer-readable medium described herein may further include operations, features, means, or instructions for determining to switch from using the UE-specific RACH procedure configuration to using the wireless backhaul-specific RACH procedure configuration, where a power ramping counter may be not reset upon switching.

In some examples of the method, apparatuses, and non-transitory computer-readable medium described herein, determining to use the UE-specific RACH procedure configuration may include operations, features, means, or instructions for selecting the UE-specific RACH procedure configuration based on an information element in a DCI transmission ordering the RACH procedure, where the information element indicates that the first wireless node should use the UE-specific RACH procedure configuration.

In some examples of the method, apparatuses, and non-transitory computer-readable medium described herein, the first wireless node may be an IAB node.

A method of wireless communications at a parent base station is described. The method may include transmitting, to a first wireless node, system information that indicates a UE-specific RACH procedure configuration and a wireless backhaul-specific RACH procedure configuration, where the first wireless node is a wireless backhaul node to the parent base station, determining that the UE-specific RACH procedure configuration is being used by the first wireless node for communicating with the parent base station, and performing a RACH procedure with the first wireless node in accordance with the UE-specific RACH procedure configuration.

An apparatus for wireless communications at a parent base station is described. The apparatus may include a processor, memory coupled with the processor, and instructions stored in the memory. The instructions may be executable by the processor to cause the apparatus to transmit, to a first wireless node, system information that indicates a UE-specific RACH procedure configuration and a wireless backhaul-specific RACH procedure configuration, where the first wireless node is a wireless backhaul node to the parent base station, determine that the UE-specific RACH procedure configuration is being used by the first wireless node for communicating with the parent base station, and perform a RACH procedure with the first wireless node in accordance with the UE-specific RACH procedure configuration.

Another apparatus for wireless communications at a parent base station is described. The apparatus may include means for transmitting, to a first wireless node, system information that indicates a UE-specific RACH procedure configuration and a wireless backhaul-specific RACH procedure configuration, where the first wireless node is a wireless backhaul node to the parent base station, determining that the UE-specific RACH procedure configuration is being used by the first wireless node for communicating with the parent base station, and performing a RACH procedure with the first wireless node in accordance with the UE-specific RACH procedure configuration.

A non-transitory computer-readable medium storing code for wireless communications at a parent base station is described. The code may include instructions executable by a processor to transmit, to a first wireless node, system information that indicates a UE-specific RACH procedure configuration and a wireless backhaul-specific RACH procedure configuration, where the first wireless node is a wireless backhaul node to the parent base station, determine that the UE-specific RACH procedure configuration is being used by the first wireless node for communicating with the parent base station, and perform a RACH procedure with the first wireless node in accordance with the UE-specific RACH procedure configuration.

In some examples of the method, apparatuses, and non-transitory computer-readable medium described herein, determining that the UE-specific RACH procedure configuration may be being used may include operations, features, means, or instructions for determining that the first wireless node may be a mobile wireless backhaul node, where the UE-specific RACH procedure configuration may be used based on the first wireless node being a mobile wireless backhaul node.

Some examples of the method, apparatuses, and non-transitory computer-readable medium described herein may further include operations, features, means, or instructions for determining one or more measurement thresholds for the first wireless node to use in determining whether to use the UE-specific RACH procedure configuration, and transmitting, to the first wireless node, an indication of the one or more measurement thresholds.

In some examples of the method, apparatuses, and non-transitory computer-readable medium described herein, one of the one or more measurement thresholds may be an RSRP associated with communications with the first wireless node.

In some examples of the method, apparatuses, and non-transitory computer-readable medium described herein, one of the one or more measurement thresholds may be a variation over time of an RSRP or a CQI associated with communications with the first wireless node.

In some examples of the method, apparatuses, and non-transitory computer-readable medium described herein, one of the one or more measurement thresholds may be a RTT associated with communications with the first wireless node.

In some examples of the method, apparatuses, and non-transitory computer-readable medium described herein, the one or more measurement thresholds may be different for different classes of wireless nodes, where the classes of wireless nodes includes a mobile wireless backhaul node, a static wireless backhaul node, a wide-area wireless backhaul node, and a local-area wireless backhaul node.

In some examples of the method, apparatuses, and non-transitory computer-readable medium described herein, the indication of the one or measurement thresholds may be transmitted via an SIB transmission.

In some examples of the method, apparatuses, and non-transitory computer-readable medium described herein, the indication of the one or measurement thresholds may be transmitted via a unicast transmission, the unicast transmission including an F1 application protocol transmission, RRC transmission, MAC-CE transmission, DCI transmission, or a combination thereof.

In some examples of the method, apparatuses, and non-transitory computer-readable medium described herein, determining that the UE-specific RACH procedure configuration may be being used may include operations, features, means, or instructions for transmitting signaling, to the first wireless node, activating the UE-specific RACH procedure configuration for communicating with the first wireless node.

In some examples of the method, apparatuses, and non-transitory computer-readable medium described herein, transmitting the signaling activating the UE-specific RACH procedure configuration further may include operations, features, means, or instructions for transmitting DCI, a MAC-CE, RRC signaling, or a combination thereof.

Some examples of the method, apparatuses, and non-transitory computer-readable medium described herein may further include operations, features, means, or instructions for receiving, from the first wireless node, a message requesting the UE-specific RACH procedure configuration be activated, where transmission of the signaling activating the UE-specific RACH procedure configuration may be based on the request.

In some examples of the method, apparatuses, and non-transitory computer-readable medium described herein, the request may be received in an UCI transmission, MAC-CE transmission, F1 application protocol transmission, or RRC transmission, or a combination thereof.

In some examples of the method, apparatuses, and non-transitory computer-readable medium described herein, determining that the UE-specific RACH procedure configuration may be being used may include operations, features, means, or instructions for transmitting an information element in a DCI transmission ordering the RACH procedure, where the information element indicates that the first wireless node should use the UE-specific RACH procedure configuration.

In some examples of the method, apparatuses, and non-transitory computer-readable medium described herein, the first wireless node may be an IAB node.

DETAILED DESCRIPTION

Figure 1:
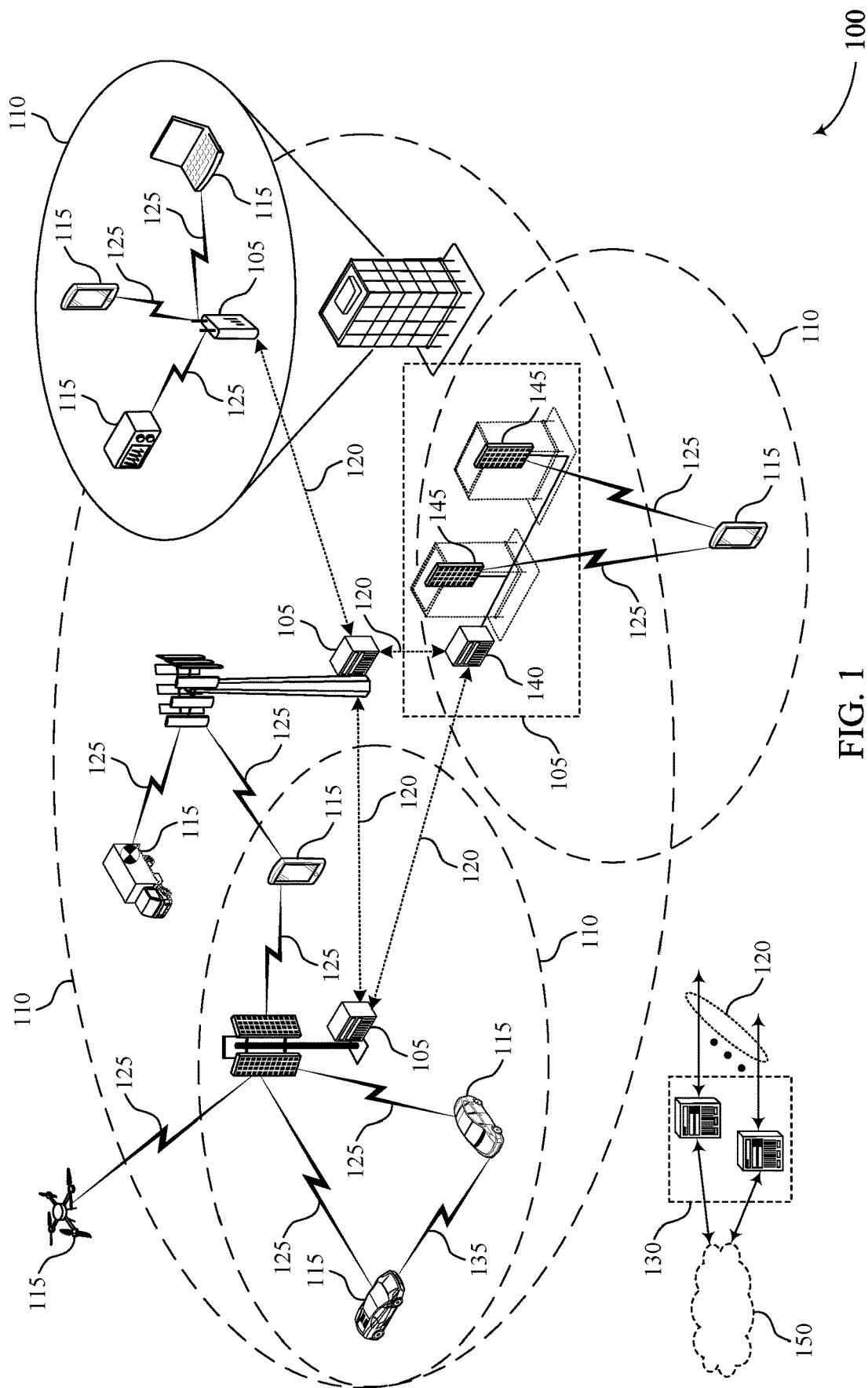
FIG. 1 illustrates an example of a system for wireless communications that supports random access channel (RACH) procedure selection by an integrated access and backhaul (IAB) node in accordance with aspects of the present disclosure.

Some wireless communication systems may be configured to support an integrated access and backhaul (IAB) network, where one or more access nodes have wireless backhaul connections to a network. The IAB network architecture may include an IAB donor node (e.g., parent IAB node) with functions to control the IAB network that is connected to the core network and terminating with a user equipment (UE), with any number of IAB nodes (e.g., child IAB nodes) in between that may act as relays for communication between the UE and the core network. In some aspects, an IAB network shares resources between access and backhaul links. Generally, the IAB donor node (which may also be referred to as an anchor node) is an access node having a wireline connection to the core network. The donor node may have a central unit (CU) that is a central entity that controls or otherwise configures resources within the IAB network. The donor node may also have one or more distributed units (DUs) that serve as scheduling nodes to schedule child nodes of the IAB donor node. Downstream from the IAB donor node may include one or more IAB nodes (also referred to as wireless nodes) within the IAB network, with each downstream IAB node constituting a hop within the IAB network. Each IAB node may relay traffic from an IAB donor node through one or more hops. In one example, each IAB node may have the DU and a mobile termination (MT). The DU of the IAB node may act as a scheduling node that schedules child nodes of this particular IAB node, which may be a UE or a child wireless node (e.g., a UE or a base station within the IAB network). The MT may serve as a scheduled node similar to a UE that is scheduled by its parent IAB node. In this context, the parent IAB node may be an IAB donor node (e.g., an anchor node) or a parent IAB node within the IAB network (e.g., an upstream wireless node).

In some wireless communications systems, the parent IAB node, such as a base station, may provide system information to a number of connected devices (e.g., child IAB nodes, IAB-MT nodes, UEs) to enable the devices to communicate with the base station. In some cases, the system information may include an indication of one or more random access channel (RACH) procedure configurations. For example, the system information may include an indication of a UE-specific RACH procedure configuration, or an IAB-specific RACH procedure configuration, or a combination thereof. Devices, such as parent nodes and child nodes, may establish communications using a RACH procedure based on a selected RACH procedure configuration. For instance, the RACH procedure may include a series of handshake messages communicated between the parent node and child node. In some examples, RACH procedures may be used when a child node has data to transmit, but does not have uplink resources assigned. In other examples, RACH procedures may be used when the child node is handed over from a source parent node to a target parent node. In any event, the RACH procedures may enable the child node to synchronize with the network and communicate with the parent node.

In conventional communications systems, if devices in the system receive both the UE-specific and IAB-specific RACH procedure configurations, UEs may use the UE-specific RACH procedure configuration and the IAB nodes may use the IAB-specific RACH procedure configuration. The parameters of the IAB-specific RACH procedure configuration may be configured based on the IAB node being static. In some cases, the IAB node may be a mobile IAB node and may operate similarly to a UE. Due to the mobile nature of the IAB node, the mobile IAB node may achieve higher performance using different RACH procedure configuration parameters than the static IAB node. For example, reduced latency may be achieved if the mobile IAB node is configured to perform RACH procedures more frequently than static IAB nodes. As such, in conventional systems where a mobile IAB node is configured to use the static IAB RACH procedure configuration, increased latency and decreased network performance may result.

To improve RACH procedures in an IAB network, the IAB node may be configured to use the IAB-specific RACH procedure configuration or the UE-specific RACH procedure configuration if the IAB node receives both configurations in the system information from the parent node. In some cases, the option to use the UE-specific RACH procedure configuration may be based on one or more conditions. For example, the child IAB node may be configured with the option to the select the UE-specific RACH procedure configuration if the IAB node is mobile or becomes mobile. Additionally or alternatively, the one or more conditions may be one or more thresholds such as a power or quality threshold of communications between the child node and parent node (e.g., reference signal receive power (RSRP) threshold, channel quality indicator (CQI) threshold), a threshold for variation over time in power or quality of communications between the child node and parent node, a round trip time (RTT) threshold, a threshold for variation in RTT over time, or a combination thereof. In some cases, the one or more conditions may be a maximum number of RACH retransmissions using the UE-specific RACH procedure configuration, or a maximum number of RACH retransmissions using the IAB-specific RACH procedure configuration. Additionally or alternatively to the one or more conditions, the option to use the UE-specific RACH procedure configuration may be based on receiving dynamic or semi-persistent signaling from the parent node that indicates that the child IAB node may use the UE-specific RACH procedure configuration.

Particular aspects of the subject matter described herein may be implemented to realize one or more advantages. The described techniques may support improvements in RACH procedures in IAB supported networks by decreasing latency and improving reliability, among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to RACH procedure selection by an IAB node.

FIG. 1 illustrates an example of a wireless communications system 100 that supports RACH procedure selection by an IAB node in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communication systems may be configured to support an IAB network, where one or more access nodes have wireless backhaul connections to a network. In such communications systems, a parent IAB node (e.g., IAB donor node, parent base station 105) may be connected to the core network and may communicate with one or more devices such as child IAB nodes or UEs 115, or a combination thereof. The parent node may transmit system information to the one or more devices that may indicate RACH procedure information to the child node. The child node may receive, from the parent node, the system information that may indicate a UE-specific RACH procedure configuration and a wireless backhaul-specific (e.g., IAB-specific) RACH procedure configuration. The child node may be configured to utilize the UE-specific RACH procedure configuration or the IAB-specific RACH procedure configuration. In some cases, the child node may use the UE-specific RACH procedure configuration upon meeting one or more conditions or upon receiving an indication from the parent node. The child node may determine to use the UE-specific RACH procedure configuration for connection with the parent node via a RACH procedure and may perform the RACH procedure with the parent node in accordance with the UE-specific RACH procedure configuration.

Figure 2:
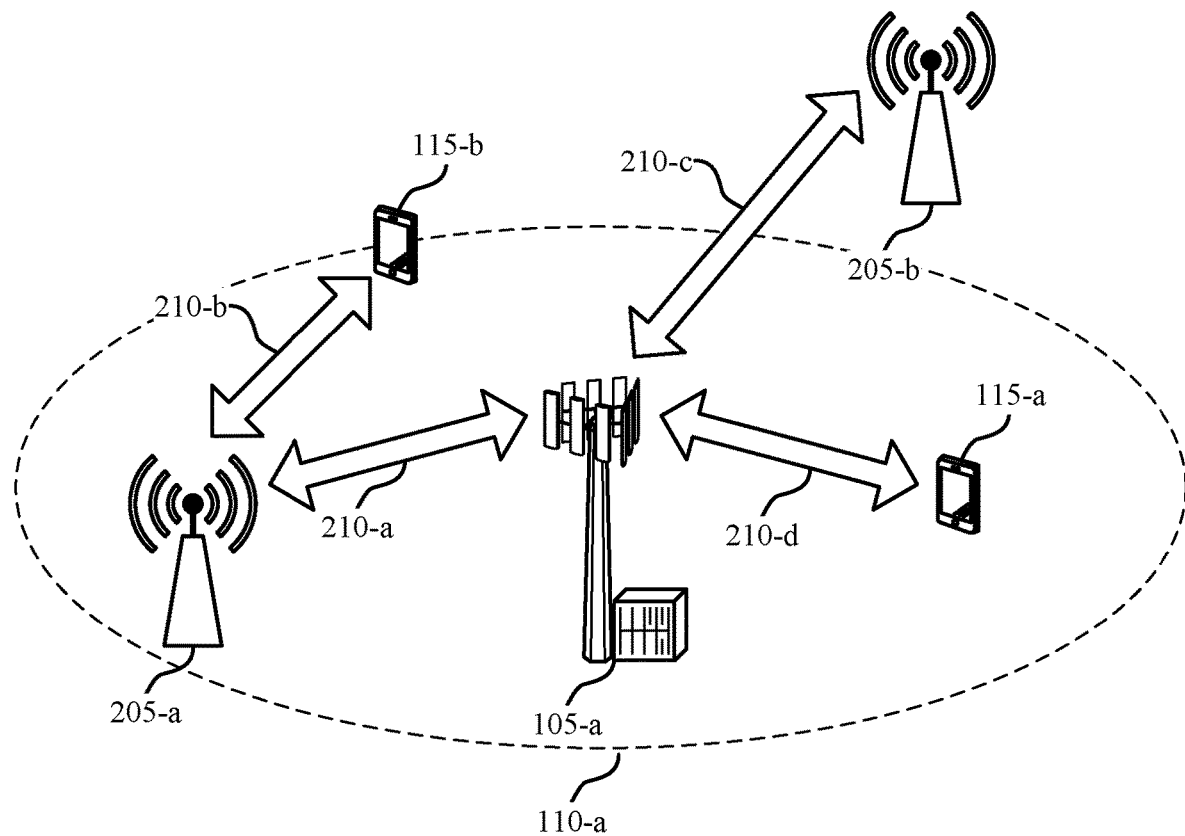
FIG. 2 illustrates an example of a system for wireless communications that supports RACH procedure selection by an IAB node in accordance with aspects of the present disclosure.

FIG. 2 illustrates an example of a wireless communications system 200 that supports RACH procedure selection by an IAB node in accordance with aspects of the present disclosure. The wireless communications system 200 may include base station 105-a (e.g., a parent base station), and UEs 115-a and 115-b, which may be examples of a base station 105 and UEs 115 as described with reference to FIG. 1. The wireless communications system 200 may also include child nodes 205-a and 205-b (e.g., child IAB nodes, IAB-MTs). Base station 105-a may serve a geographic coverage area 110-a. In some cases, child nodes 205-a or 205-b, or both may be configured to use a UE-specific RACH procedure configuration or an IAB-specific RACH procedure configuration for performing RACH procedures with base station 105-a and may perform a RACH configuration determination procedure. Additionally or alternatively, other wireless devices, such as base station 105-a or UEs 115-a and 115-b, or some combination of these devices, may implement a RACH configuration determination procedure.

Wireless communication system 200 may be configured to support an IAB network, where one or more access nodes have wireless backhaul connections to a network. For example, base station 105-a (e.g., parent node, IAB donor node, parent base station) may be connected to the network and communicate with one or more UEs 115, or one or more child nodes (e.g., child IAB nodes, IAB-MTs), or a combination thereof. For example, base station 105-a may communicate with child nodes 205-a and 205-b over communication links 210-a and 210-b, respectively and base station 105-a may communicate with UE 115-a over communication link 210-d. In some cases, a child node 205 may act as a relay node to one or more UEs 115, where the one or more UEs 115 may be referred to as children of the child node 205. For example, child node 205-a may communicate with UE 115-b over communication link 210-b. Additionally or alternatively, UE 115-b may receive communications directly from base station 105-a.

In wireless communications system 200, devices may establish communications with other devices via a RACH procedure. For example, a child node 205 may perform a RACH procedure with a base station 105 to establish communications, a UE 115 may perform a RACH procedure with a child node 205 to establish communications, and a UE 115 may perform a RACH procedure with a base station 105 to establish communications. In some examples, RACH procedures may be used when a child node 205 has data to transmit, but does not have uplink resources assigned for communicating with a parent node. In other examples, RACH procedures may be used when the child node 205 is handed over from a source base station 105 to a target base station 105. In any event, the RACH procedures may enable the child node 205 to synchronize with the network and communicate with the base station 105. The RACH procedure may include a series of handshake messages communicated between the devices. For example, a child node 205 may transmit to base station 105-a a RACH message 1 (msg1) that may include a RACH preamble, and base station 105-a may respond to the child node 205 with a RACH message 2 (msg2) that may include a RACH preamble response. The RACH preamble response may include information for the child node 205 (e.g., an uplink grant, modulation and coding scheme (MCS) configuration, resource block (RB) assignment, and other configuration information). The child node 205 may receive and decode the RACH msg2 and configure and transmit a RACH message 3 (msg3) to base station 105-a. In some cases, RACH msg3 may include a radio resource control (RRC) connection request. Base station 105-a may receive and decode the RACH msg3 to generate RACH message 4 (msg 4) using the received information (e.g., RRC connection request). Base station 105-a may transmit a RACH msg 4 that may include an RRC connection setup corresponding to the child node 205.

Prior to performing a RACH procedure, the network may determine one or more RACH procedure configurations. In some cases, the RACH procedure configurations may be device specific. For example, base station 105-a may configure a UE-specific RACH procedure configuration and an IAB-specific RACH procedure configuration. Additionally or alternatively, base station 105-a may configure a common RACH procedure configuration to be used by any device, such as UEs 115 or child nodes 205. The RACH configuration may define RACH periodicity, etc. The network, such as base station 105-a, may transmit the one or more RACH procedure configurations to UEs 115 and child nodes 205 such that both devices may identify both RACH configurations. The one or more RACH procedure configurations may be included in system information such that base station 105-a may transmit system information to UEs 115 and child nodes 205 that may indicate a UE-specific RACH procedure configuration, or an IAB-specific RACH procedure configuration, or a combination thereof or indicate a common RACH procedure configuration.

In some implementations, the configuration of the IAB-specific RACH procedure and the configuration of the UE-specific RACH procedure may be different. For example, the IAB-specific RACH procedure may be based on the IAB nodes (e.g., child nodes) being static, as opposed to the UE-specific RACH procedure that may be based on the UEs 115 being mobile. Additionally or alternatively, IAB nodes may be located at a greater distance from base station 105-a than UEs 115-a resulting in a greater maximum RTT associated with IAB nodes. For example, UEs 115 within coverage area 110-a may communicate with base station 105-a. However, if a UE 115 moves outside coverage area 110-a, the UE 115 may perform a handover procedure and communicate with a different base station 105. A child node 205, however, may communicate with base station 105-a if the child node is outside of coverage area 110-a. For example, child node 205-b is outside of coverage area 110-a and may communicate with base station 105-a. As such, the greatest distance a UE 115 may be from its serving base station 105 may be less than the greatest distance a child node 205 may be from its serving base station 105 resulting in a greater maximum RTT for the child nodes 205. The device specific RACH configurations may account for this difference in maximum RTT and device mobility.

In conventional systems, if base station 105-a configures a device specific RACH procedure configuration, then each device may be required to use to the RACH procedure configuration associated with it. For example, if a child node 205 receives an indication of a UE-specific RACH procedure configuration and an IAB-specific RACH procedure configuration, the child node 205 may be required to use the IAB-specific RACH procedure configuration. In some wireless communications systems, an IAB node such as a child node 205 may be or become mobile (e.g., the IAB node may be placed on a moving vehicle such as a car, train, plane, etc., or be placed on some other mobile object). As described herein, the conventional IAB-specific RACH procedure configuration may be based on the IAB node being static. As such, the parameters of the IAB-specific RACH procedure configuration may not efficiently serve a mobile IAB node. For example, a mobile IAB node may need to perform RACH procedures more frequently than the periodicity that is defined by the IAB-specific RACH procedure configuration. As such, latency and decreased reliability in the network may result.

To mitigate latency and improve network performance, an IAB node, such as a child node 205, may be configured to select between a UE-specific RACH procedure configuration and an IAB-specific RACH procedure configuration to perform a RACH procedure, if the IAB node received both configurations. The UE-specific RACH procedure may allow for more efficient (e.g., faster) RACH procedures in some situations. For example, a UE-specific RACH procedure may be configured with more RACH occasions than the IAB-specific RACH procedure. As such, the RACH occasions the IAB node may use may increase if the IAB node can select between the UE-specific and IAB-specific RACH procedure configurations.

In some cases, the option to use the UE-specific RACH procedure configuration may be based on one or more conditions. Each IAB node in the network may be statically configured or receive dynamic, semi-persistent, or aperiodic indications of the one or more conditions. In some cases, the one or more conditions may include that the IAB-node is mobile. For example, a child node 205 may determine that the child node 205 is mobile and determine that the child node 205 can select between the UE and IAB specific RACH procedure configurations based on the child node 205 being mobile. Additionally or alternatively, any IAB node, regardless of mobility, may select between RACH procedure configurations. In some cases, a child node 205, that may or may not be mobile, may select a RACH procedure configuration based on the RACH occasions of each RACH procedure configuration or based on some other RACH procedure configuration parameter. For example, a child node 205 may determine that the child node 205 can select between the RACH procedure configuration based on the one or more conditions, and may determine that the UE-specific RACH procedure configuration is configured with a RACH occasion earlier than the next IAB-specific RACH procedure configuration. The child node 205 may determine to use the UE-specific RACH procedure configuration based on this RACH occasion determination.

In some cases, the one or more conditions may be configured differently for each different category of IAB node (e.g., mobile IAB node, static IAB node, wide-area IAB node, local-area IAB node). For example, a different set of conditions may be configured for each different category of IAB node. In such cases, base station 105-a may transmit an indication of the one or more category specific conditions to IAB nodes associated with the particular category in a unicast manner (e.g., F1 application protocol between CU and DU, RRC, medium access control (MAC) control element (MAC-CE), downlink control information (DCI)). For example, base station 105-a may transmit separate unicast messages to each IAB node of a different category that may include the one or more conditions associated with that category. Additionally or alternatively, the one or more conditions may be configured similarly across multiple different categories of IAB nodes. For example, one set of common conditions may be configured to be used by multiple different types of IAB nodes. In such cases, base station 105-a may transmit an indication of the one or more common conditions in a broadcast manner to each IAB node being served by base station 105-a (e.g., broadcast in S1B).

In some cases, the one or more conditions may include one or more signal power or signal quality thresholds for communications between the child node 205 and base station 105-a. For example, the one or more conditions may include an RSRP threshold, a CQI threshold, or a both, or some other signal power or signal quality threshold. The child node 205 may measure the RSRP, CQI, or both associated with communications between the child node 205 and base station 105-a. If the measured RSRP or CQI is above the RSRP threshold or CQI threshold, respectively, the child node 205 may be use either the UE-specific RACH procedure configuration or the IAB-specific RACH procedure configuration. In some cases, the larger the RSRP or CQI measurement, the closer a child node 205 may be to base station 105-a, resulting in the RTT of the child node 205 being the same or similar to the RTT of a UE 115. As such, the UE-specific RACH procedure configuration may more efficiently serve the child node 205 than the IAB-specific RACH procedure configuration.

In some implementations, one or more of the signal power or signal quality thresholds may be set to 0 (e.g., 0 db). In such cases, the measured signal power or signal quality may always be greater than the threshold so the child node 205 may use the UE-specific RACH procedure configuration as long as the threshold is 0. In some cases, the child node 205 may be mobile to use the UE-specific RACH procedure configuration even if the threshold is set to 0. In some implementations, one or more of the signal power or signal quality thresholds may be set to infinity or some other large number. In such cases, the measured signal power or signal quality may always be lower than the threshold so the child node 205 may not use the UE-specific RACH procedure configuration as long as the threshold is infinity.

In some cases, the one or more conditions may include one or more thresholds associated with the variation over time of signal power or signal quality for communications between the child node 205 and base station 105-a. For example, a child node 205 may be configured with a threshold associated with the variation of RSRP over time, or a threshold associated with the variation of CQI over time, or both, or some other variation matric. The child node may be configured with a threshold value, and an amount of time over which the variation may be measured. A child node 205 may use criterion based on the measured RSRP or CQI that captures the amount of metric variations to determine whether the child node 205 may use the UE-specific RACH procedure configuration. In some cases, large variations in RSRP or CQI or some other channel quality or power indicator may be an indication that the child node 205 is mobile relative to the parent node of the child node 205 (e.g., base station 105-a). As such, the child node 205 may be configured to use the UE-specific RACH procedure configuration and the IAB-specific RACH procedure configuration when a child node 205 or base station 105 detects a large variation in RSRP or CQI over time.

In some cases, the one or more conditions may include one or more RTT thresholds associated with communications between the child node 205 and base station 105-a. In some implementations, a child node 205 may already be connected to the network and the child node 205 may be camping on the cell where the child node 205 previously performed an initial RACH procedure to connect to the network. In such cases, the child node 205 may identify an RTT associated with communications between the child node 205 and the parent node (e.g., base station 105-b). In some cases, RTT may be estimated based on one or more timing indication messages received from the parent node and/or another network node. A timing indication message may be an uplink timing advance command (TAC), or a timing difference indication (e.g., a T delta indication that may be used in IAB network to estimate the downlink transmit timing at the parent-node). Additionally or alternatively to RTT threshold, a threshold may be defined based on TAC, T delta or a combination thereof. The child node 205 may determine to perform a RACH procedure to obtain updated uplink resource information. This RACH procedure may be referred to as a non-initial RACH procedure. For a non-initial RACH procedure when the child node 205 has already identified an RTT associated with communications between the child node 205 and base station 105-a, RTT may be parameter the child node 205 may use to determine the eligibility of the child node 205 to use the UE-specific RACH procedure configuration. In some cases, the child node 205 may be configured with an RTT threshold. A measured RTT associated with the child node 205 that is below the threshold may indicate that the child node 205 is within the maximum RTT associated with the UEs 115. As such, the child node 205 may use the UE-specific RACH procedure configuration. Additionally or alternatively, the child node 205 may be configured with a threshold of the variation in RTT over time. The child node may be configured with a threshold value, and an amount of time over which the variation may be measured. A measured variation in RTT that is greater than the threshold may be an indication that the child node 205 is mobile. As such, the child node 205 may use the UE-specific RACH procedure configuration.

In some implementations, the child node 205 may be configured to start a RACH procedure using the IAB-specific RACH procedure configuration (e.g., and only the IAB-specific RACH procedure configuration). In some cases, the parent node (e.g., base station 105-a) or the child node 205 may be unable to receive and successfully decode one or more of the RACH messages. For example, base station 105-a may fail to successfully decode the RACH msg1 from a child node. In such cases, the child node 205 may retransmit the RACH msg1 until base station 105-a successfully decodes the RACH msg1 and responds with RACH msg2. The child node 205 may be configured to retransmit the RACH msg1 or some other RACH message up to a preconfigured number of retransmissions (e.g., maxNumOfReTx) using the IAB-specific RACH procedure configuration. If the child node 205 has transmitted up to the preconfigured number of retransmissions with an unsuccessful result using the IAB-specific RACH procedure configuration, the child node 205 may be allowed to use the UE-specific RACH procedure configuration.

In some implementations, the child node 205 may use the UE-specific RACH procedure configuration after meeting the one or more conditions described herein, or the child node 205 may use the UE-specific RACH procedure configuration without meeting the one or more conditions described herein. The child node 205 may use the UE-specific RACH procedure configuration to perform the RACH procedure. In some cases, the parent node (e.g., base station 105-a) or the child node 205 may be unable to receive and successfully decode one or more of the RACH messages. For example, base station 105-a may fail to successfully decode the RACH msg1 from a child node. In such cases, the child node 205 may retransmit the RACH msg1 until base station 105-a successfully decodes the RACH msg1 and responds with RACH msg2. The child node 205 may be configured to retransmit the RACH msg1 or some other RACH message up to a preconfigured number of retransmissions (e.g., maxNumOfReTx) using the UE-specific RACH procedure configuration. If the child node 205 has transmitted up to the preconfigured number of retransmissions with an unsuccessful result using the UE-specific RACH procedure configuration, the child node 205 may be configured (e.g., required) to switch to the IAB-specific RACH procedure configuration.

In some cases, the usage of UE-specific RACH may be dynamically indicated by the network (e.g., base station 105-a) to the child node 205 (e.g., IAB-MT). For example, when base station 105-a indicates both the UE-specific and IAB-specific RACH procedure configuration, base station 105-a may dynamically transmit an activation or deactivation signal (e.g., in DCI, or MAC-CE) to indicate whether the child node 205 is allowed to use the UE-specific RACH procedure configuration. Additionally or alternatively, base station 105-a may semi-statically transmit an activation or deactivation signal (e.g., in an RRC message) to indicate whether the child node 205 is allowed to use UE-specific RACH procedure configuration. In some cases, the child node 205 may transmit to base station 105-a a request to use the UE-specific RACH procedure configuration. For example, the child node 205 may transmit a request in an uplink transmission such as uplink control information (UCI), MAC-CE, etc. to base station 105-a. In another example, the child node 205 may transmit a request to the CU entity in RRC, F1 application protocol, etc. In some cases, the child node 205 may receive an activation or deactivation signal from base station 105-a in response to the request. In some cases, for a physical downlink control channel (PDCCH) ordered RACH, base station 105-a may transmit DCI to the child node 205 that includes an information element (IE) that may indicate whether the child node 205 (e.g., IAB-MT) may use the IAB-specific or UE-specific RACH procedure configuration for the ordered RACH transmission.

In some implementations, if a child node 205 retransmits a RACH message, each retransmission may be retransmitted with a higher transmission power according to a preconfigured power ramp. A child node 205 may be configured with a power ramping counter that increments at each retransmission. If the child node 205 switches between RACH procedure configurations as a result of unsuccessful retransmissions, the power ramping counter may not be reset. For example, the child node 205 may transmit a RACH message based on either the UE-specific RACH procedure configuration or the IAB-specific RACH procedure configuration. The RACH message may not be successfully decoded by base station 105-a and child node 205 may retransmit the RACH message with a higher transmission power using the same RACH procedure configuration up to a preconfigured parameter (e.g., up to a certain amount of time, or certain number of retransmissions). When the preconfigured parameter is reached, the child node 205 may switch RACH procedure configurations and continue retransmitting the RACH message using the new RACH procedure configuration while continue to perform transmission power ramping with each retransmission.

The one or more conditions, determinations, and procedures described herein may be used in any combination to determine whether a child node 205 may use the UE-specific RACH procedure configuration.

Figure 3:
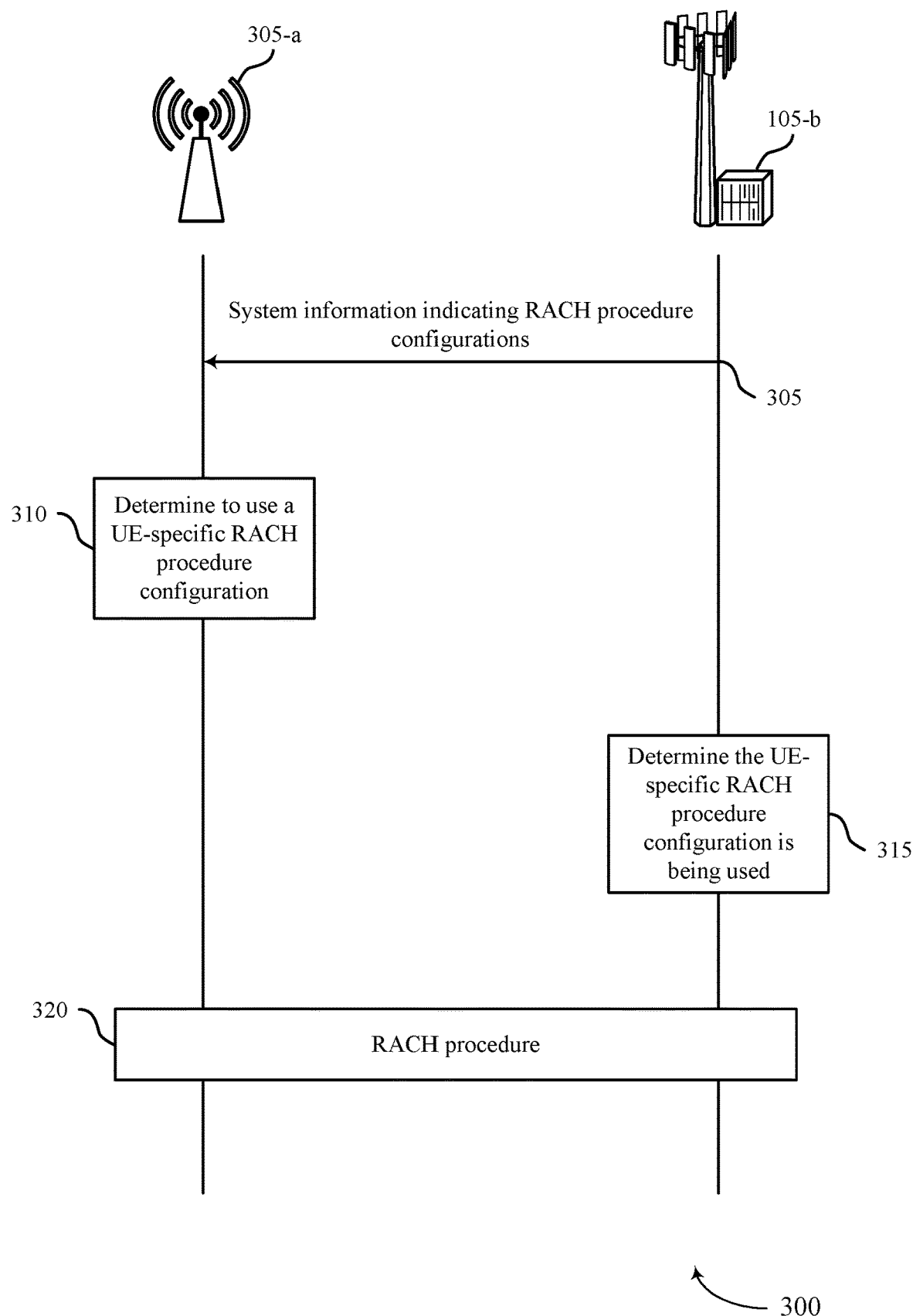
FIG. 3 illustrates an example of a process flow that supports RACH procedure selection by an IAB node in accordance with aspects of the present disclosure.

FIG. 3 illustrates an example of a process flow 300 that supports RACH procedure selection by an IAB node in accordance with aspects of the present disclosure. The process flow 300 may illustrate an example RACH configuration selection procedure by an IAB node. For example, child node 305-*c* (e.g., a first wireless node, IAB-MT) may perform a RACH configuration determination procedure for selecting a RACH procedure configuration for performing a RACH procedure with base station 105-*b*. Base station 105-*b* and child node 305-*a* may be examples of the corresponding wireless devices described with reference to FIGS. 1 and 2. In some cases, instead of child node 305-*c* performing the RACH configuration determination procedure, a different type of wireless device (e.g., a UE or base station 105-*b*) may perform the procedure. Alternative examples of the following may be implemented, where some steps are performed in a different order than described or are not performed at all. In some cases, steps may include additional features not mentioned below, or further steps may be added.

At 305, child node 305-*a* may receive, from parent base station 105-*b*, system information that indicates a UE-specific RACH procedure configuration and a wireless backhaul-specific (e.g., IAB-specific) RACH procedure configuration, where child node 305-*a* is a wireless backhaul node to parent base station 105-*b*.

At 310, child node 305-*a* may determine to use the UE-specific RACH procedure configuration for communicating with parent base station 105-*b*. In some cases, determining to use the UE-specific RACH procedure configuration includes selecting the UE-specific RACH procedure configuration based on child node 305-*a* being a mobile wireless backhaul node. In some implementations, selecting the UE-specific RACH procedure configuration includes determining that a next UE-specific RACH occasion occurs prior to a next wireless backhaul-specific RACH occasion, and selecting the UE-specific RACH procedure configuration based on the next UE-specific RACH occasion occurring before the next wireless backhaul-specific RACH occasion.

In some cases, determining to use the UE-specific RACH procedure configuration includes selecting the UE-specific RACH procedure configuration based on satisfaction of one or more measurement thresholds. Base station 105-*b* may determine the one or more measurement thresholds and transmit an indication of the one or more measurement thresholds to child node 305-*a*. In some cases, the indication of the one or more measurements may be includes in the system information. In one example, selecting the UE-specific RACH procedure configuration includes determining an RSRP associated with communications with parent base station 105-*a*, identifying that the determined RSRP exceeds a threshold RSRP from the one or more measurement thresholds, and selecting the UE-specific RACH procedure configuration based on the identifying. In another example, selecting the UE-specific RACH procedure configuration includes determining a variation over time of an RSRP or a CQI associated with communications with parent base station 105-*a*, identifying that the determined variation exceeds a respective threshold RSRP variation or threshold CQI variation from the one or more measurement thresholds, and selecting the UE-specific RACH procedure configuration based on the identifying.

In another example, selecting the UE-specific RACH procedure configuration includes determining an RTT associated with communications with parent base station 105-*a*, identifying that the determined RTT is less than a threshold RTT from the one or more measurement thresholds, and selecting the UE-specific RACH procedure configuration based on the identifying. In another example, selecting the UE-specific RACH procedure configuration includes determining a variation in RTT associated with communications with parent base station 105-*a*, identifying that the determined variation RTT exceeds a threshold variation RTT from the one or more measurement thresholds, and selecting the UE-specific RACH procedure configuration based on the identifying.

In some cases, the one or more measurement thresholds are different for different classes of wireless nodes, where the classes of wireless nodes includes a mobile wireless backhaul node, a static wireless backhaul node, a wide-area wireless backhaul node, and a local-area wireless backhaul node. In some cases, child node 305-*a* may receive, from parent base station 105-*a*, the one or more measurement thresholds via a system information block (SIB) transmission. In some cases, child node 305-*a* may receive, from parent base station 105-*a*, the one or more measurement thresholds via a unicast transmission, the unicast transmission including an F1 application protocol transmission, RRC transmission, MAC-CE transmission, DCI transmission, or a combination thereof.

In some implementations, determining to use the UE-specific RACH procedure configuration includes identifying that a quantity of RACH attempts using the wireless backhaul-specific RACH procedure configuration exceeds a threshold quantity of attempts, and selecting the UE-specific RACH procedure configuration based on the identifying.

In some cases, child node 305-*a* may attempt to perform the RACH procedure with parent base station 105-*a* in accordance with the UE-specific RACH procedure configuration, identify that a quantity of RACH attempts using the UE-specific RACH procedure configuration exceeds a threshold quantity of attempts, and determine to switch from using the UE-specific RACH procedure configuration to using the wireless backhaul-specific RACH procedure configuration based on the identifying.

In some cases, determining to use the UE-specific RACH procedure configuration includes receiving signaling, from parent base station 105-*a*, activating the UE-specific RACH procedure configuration for communicating with parent base station 105-*a*. Child node 305-*a* may receive DCI, a MAC-CE, RRC signaling, or a combination thereof that activates the UE-specific RACH procedure configuration. In some cases, child node 305-*a* may transmit to parent base station 105-*b*, a message requesting the UE-specific RACH procedure configuration be activated, where receipt of the signaling activating the UE-specific RACH procedure configuration is based on the request. The request may be transmitted in a UCI transmission, MAC-CE transmission, F1 application protocol transmission, or RRC transmission, or a combination thereof.

Child node 305-*a* may determine to switch from using the UE-specific RACH procedure configuration to using the wireless backhaul-specific RACH procedure configuration, where a power ramping counter is not reset upon switching. In some cases, determining to use the UE-specific RACH procedure configuration includes selecting the UE-specific RACH procedure configuration based on an IE in a DCI transmission ordering the RACH procedure, where the IE indicates that child node 305-*a* should use the UE-specific RACH procedure configuration.

At 315, parent base station 105-*b* may determine that the UE-specific RACH procedure configuration is being used by child node 305-*a* for communicating with parent base station 105-*b*.

At 320, child node 305-*a* may perform a RACH procedure with parent base station 105-*b* in accordance with the UE-specific RACH procedure configuration. In some cases, the child node 305-*a* may perform a RACH procedure with parent base station 105-*b* to establish a connection with parent base station 105-*b*, to transmit a system information request, for uplink synchronization, for beam failure recovery, etc.

Figure 4:
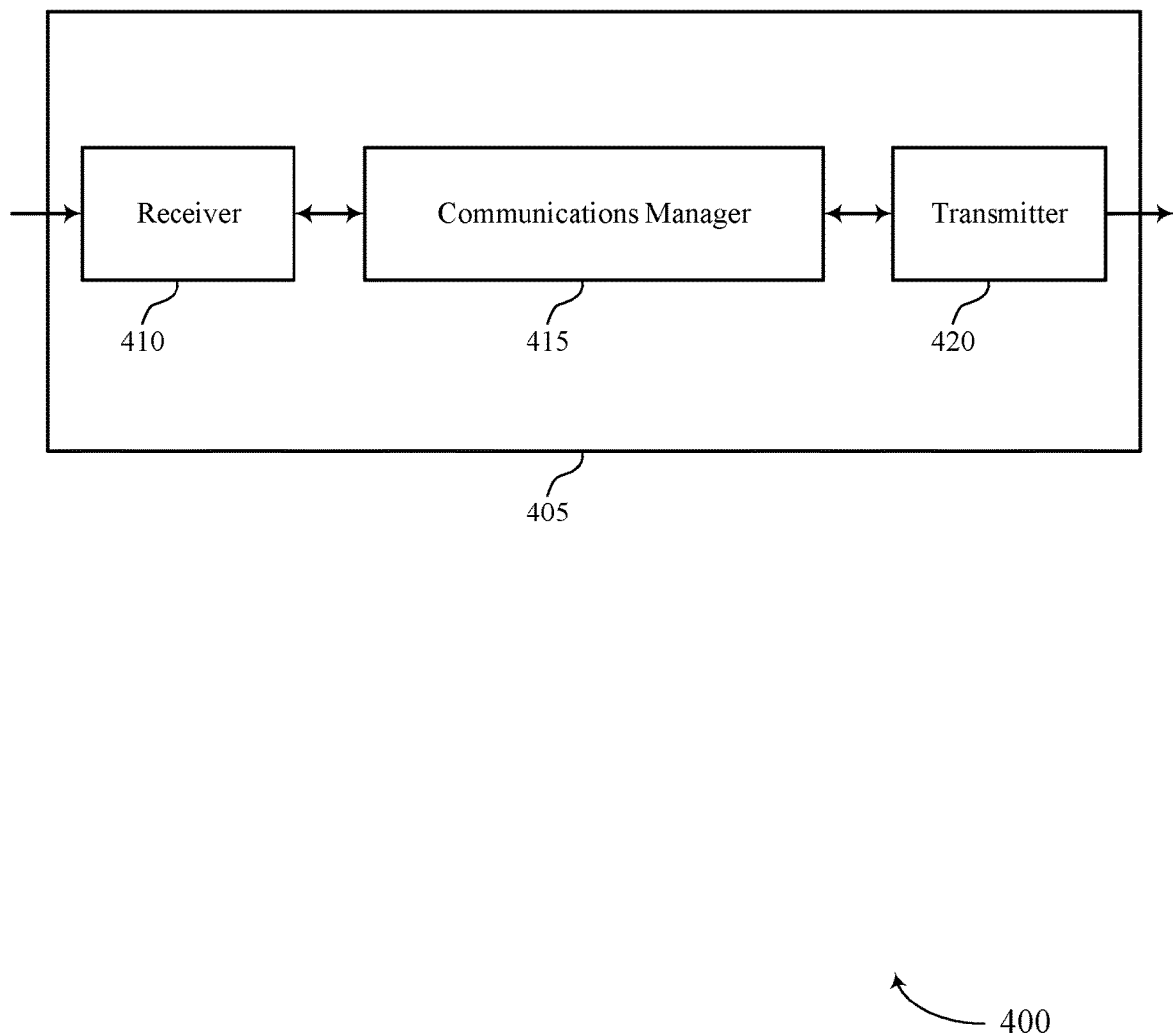
FIGS. 4 and 5 show block diagrams of devices that support RACH procedure selection by an IAB node in accordance with aspects of the present disclosure.

FIG. 4 shows a block diagram 400 of a device 405 that supports RACH procedure selection by an IAB node in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to RACH procedure selection by an IAB node, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a parent base station, system information that indicates a UE-specific RACH procedure configuration and a wireless backhaul-specific RACH procedure configuration, where the first wireless node is a wireless backhaul node to the parent base station, determine to use the UE-specific RACH procedure configuration for communicating with the parent base station, and perform a RACH procedure with the parent base station in accordance with the UE-specific RACH procedure configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. One implementation may allow the device 405 to more efficiently perform RACH procedure with a parent node. For example, a device 405 may be configured to determine whether the device 405 may use a UE-specific RACH procedure or an IAB-specific RACH procedure. If device 405 is able to use either RACH procedure, device 405 may determine which RACH procedure to use to decrease latency associated with performing the RACH procedure.

Based on implementing the RACH procedure determination techniques as described herein, a processor of a UE 115 (e.g., controlling the receiver 410, the transmitter 420, or the transceiver 720 as described with reference to FIG. 7) may increase reliability and efficiency in performing RACH procedures in IAB networks.

Figure 5:
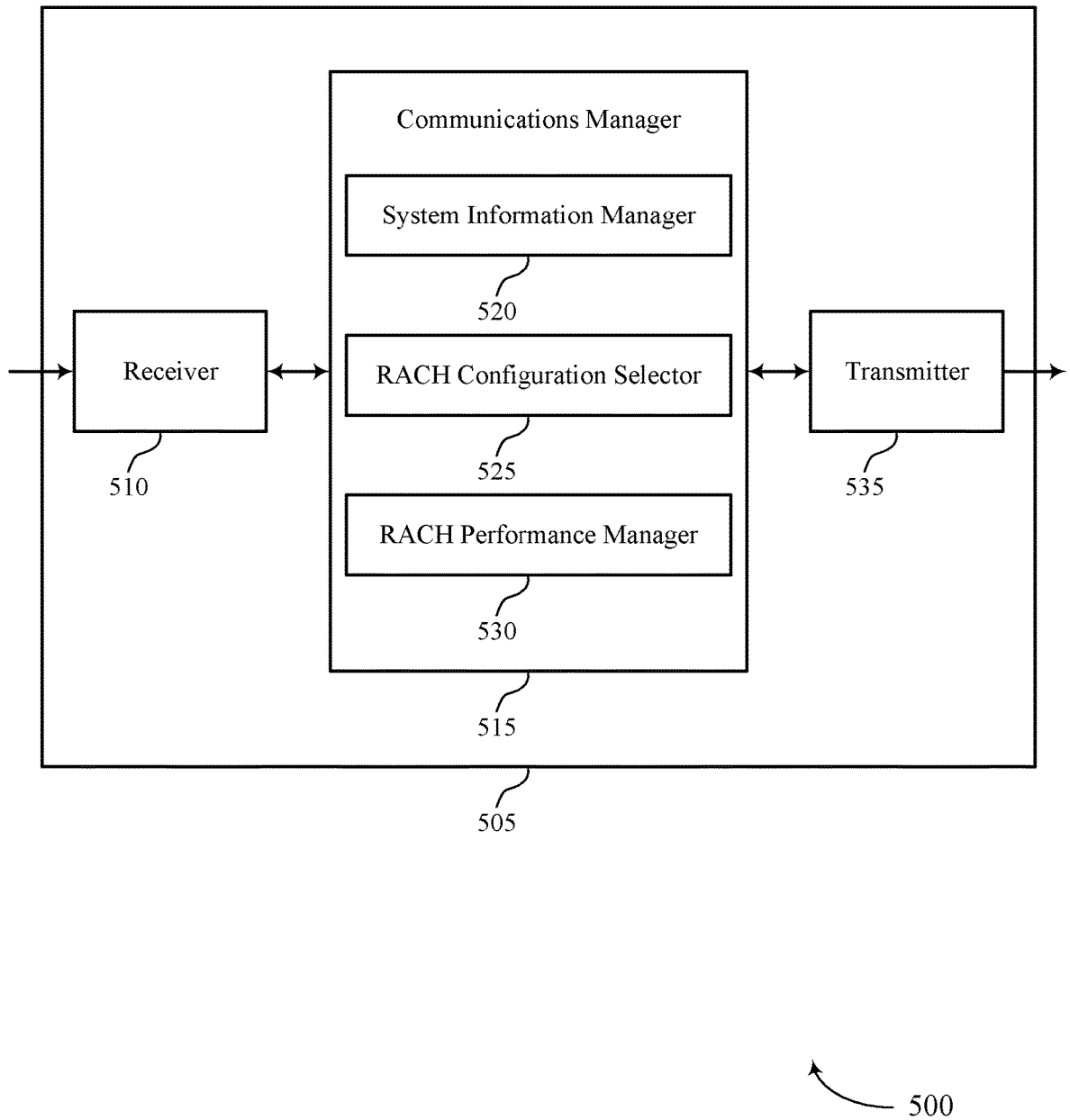

FIG. 5 shows a block diagram 500 of a device 505 that supports RACH procedure selection by an IAB node in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to RACH procedure selection by an IAB node, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a system information manager 520, a RACH configuration selector 525, and a RACH performance manager 530. The communications manager 515 may be an example of aspects of the communications manager 710 described herein.

The system information manager 520 may receive, from a parent base station, system information that indicates a UE-specific RACH procedure configuration and a wireless backhaul-specific RACH procedure configuration, where the first wireless node is a wireless backhaul node to the parent base station. The RACH configuration selector 525 may determine to use the UE-specific RACH procedure configuration for communicating with the parent base station. The RACH performance manager 530 may perform a RACH procedure with the parent base station in accordance with the UE-specific RACH procedure configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
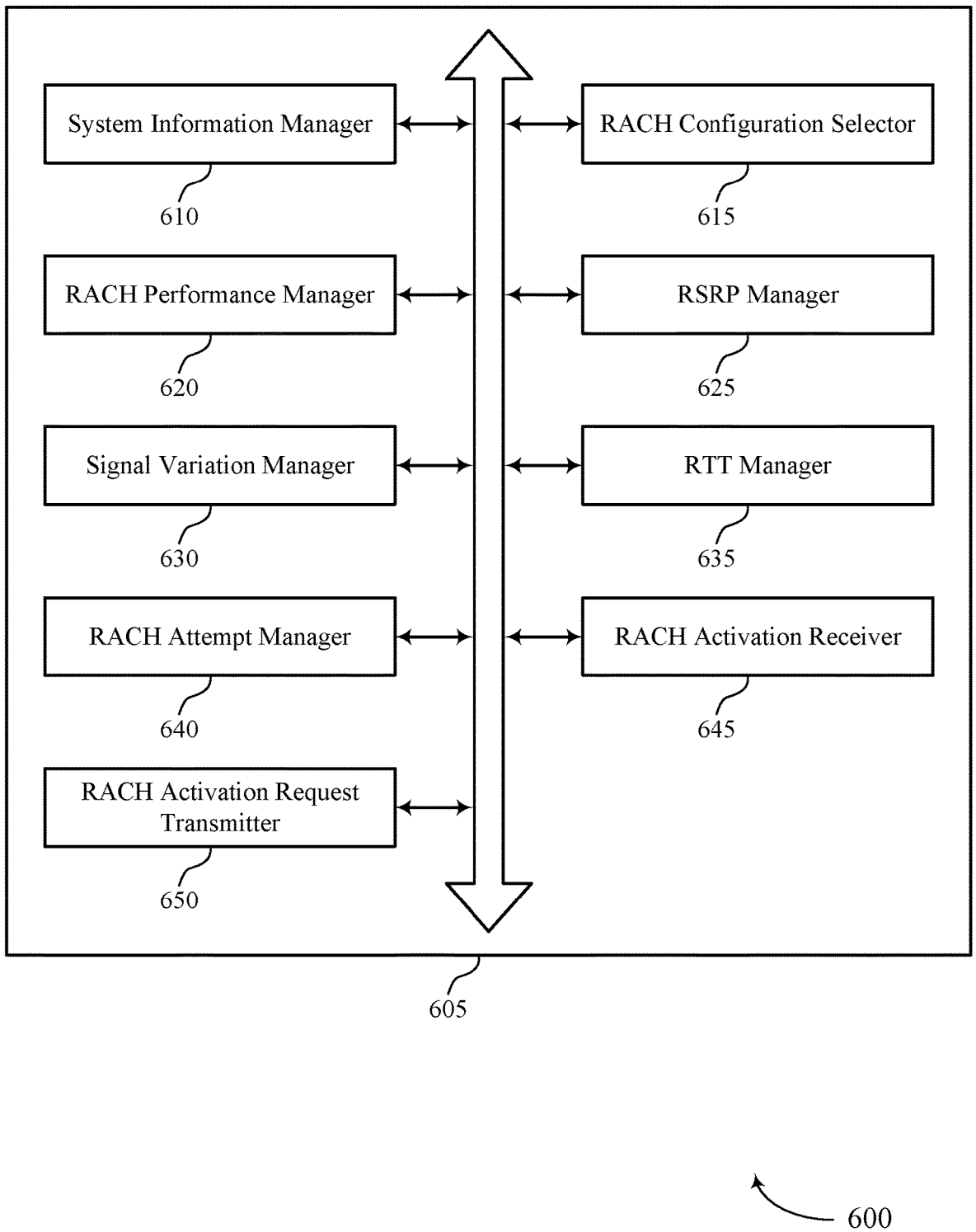
FIG. 6 shows a block diagram of a communications manager that supports RACH procedure selection by an IAB node in accordance with aspects of the present disclosure.

FIG. 6 shows a block diagram 600 of a communications manager 605 that supports RACH procedure selection by an IAB node in accordance with aspects of the present disclosure. The communications manager 605 may be an example of aspects of a communications manager 415, a communications manager 515, or a communications manager 710 described herein. The communications manager 605 may include a system information manager 610, a RACH configuration selector 615, a RACH performance manager 620, an RSRP manager 625, a signal variation manager 630, an RTT manager 635, a RACH attempt manager 640, a RACH activation receiver 645, and a RACH activation request transmitter 650. Each of these modules may communicate, directly or indirectly, with one another (e.g., via one or more buses).

The system information manager 610 may receive, from a parent base station, system information that indicates a UE-specific RACH procedure configuration and a wireless backhaul-specific RACH procedure configuration, where the first wireless node is a wireless backhaul node to the parent base station. The RACH configuration selector 615 may determine to use the UE-specific RACH procedure configuration for communicating with the parent base station. The RACH performance manager 620 may perform a RACH procedure with the parent base station in accordance with the UE-specific RACH procedure configuration. In some cases, the first wireless node is an IAB node.

In some examples, the RACH configuration selector 615 may select the UE-specific RACH procedure configuration based on the first wireless node being a mobile wireless backhaul node.

In some examples, the RACH configuration selector 615 may determine that a next UE-specific RACH occasion occurs prior to a next wireless backhaul-specific RACH occasion. In some examples, the RACH configuration selector 615 may select the UE-specific RACH procedure configuration based on the next UE-specific RACH occasion occurring before the next wireless backhaul-specific RACH occasion.

In some examples, the RACH configuration selector 615 may select the UE-specific RACH procedure configuration based on satisfaction of one or more measurement thresholds.

The RSRP manager 625 may determine an RSRP associated with communications with the parent base station. In some examples, the RSRP manager 625 may identify that the determined RSRP exceeds a threshold RSRP from the one or more measurement thresholds. In some examples, the RACH configuration selector 615 may select the UE-specific RACH procedure configuration based on the identifying.

The signal variation manager 630 may determine a variation over time of an RSRP or a CQI associated with communications with the parent base station. In some examples, the signal variation manager 630 may identify that the determined variation exceeds a respective threshold RSRP variation or threshold CQI variation from the one or more measurement thresholds. In some examples, the RACH configuration selector 615 may select the UE-specific RACH procedure configuration based on the identifying.

The RTT manager 635 may determine a RTT associated with communications with the parent base station. In some examples, the RTT manager 635 may identify that the determined RTT is less than a threshold RTT from the one or more measurement thresholds. In some examples, the RACH configuration selector 615 may select the UE-specific RACH procedure configuration based on the identifying.

In some examples, the RTT manager 635 may determine a variation in RTT associated with communications with the parent base station. In some examples, the RTT manager 635 may identify that the determined variation RTT exceeds a threshold variation RTT from the one or more measurement thresholds. In some examples, the RACH configuration selector 615 may select the UE-specific RACH procedure configuration based on the identifying.

In some cases, the one or more measurement thresholds are different for different classes of wireless nodes, where the classes of wireless nodes includes a mobile wireless backhaul node, a static wireless backhaul node, a wide-area wireless backhaul node, and a local-area wireless backhaul node. In some examples, the RACH configuration selector 615 may receive, from the parent base station, the one or more measurement thresholds via a SIB transmission. In some examples, the RACH configuration selector 615 may receive, from the parent base station, the one or more measurement thresholds via a unicast transmission, the unicast transmission including an F1 application protocol transmission, RRC transmission, MAC-CE transmission, DCI transmission, or a combination thereof.

The RACH attempt manager 640 may identify that a quantity of RACH attempts using the wireless backhaul-specific RACH procedure configuration exceeds a threshold quantity of attempts. In some examples, the RACH configuration selector 615 may select the UE-specific RACH procedure configuration based on the identifying.

In some examples, the RACH attempt manager 640 may attempt to perform the RACH procedure with the parent base station in accordance with the UE-specific RACH procedure configuration. In some examples, the RACH attempt manager 640 may identify that a quantity of RACH attempts using the UE-specific RACH procedure configuration exceeds a threshold quantity of attempts. In some examples, the RACH configuration selector 615 may determine to switch from using the UE-specific RACH procedure configuration to using the wireless backhaul-specific RACH procedure configuration based on the identifying.

The RACH activation receiver 645 may receive signaling, from the parent base station, activating the UE-specific RACH procedure configuration for communicating with the parent base station. In some examples, the RACH activation receiver 645 may receive DCI, a MAC-CE, RRC signaling, or a combination thereof. The RACH activation request transmitter 650 may transmit, to the parent base station, a message requesting the UE-specific RACH procedure configuration be activated, where receipt of the signaling activating the UE-specific RACH procedure configuration is based on the request. In some cases, the request is transmitted in an UCI transmission, MAC-CE transmission, F1 application protocol transmission, or RRC transmission, or a combination thereof.

In some examples, the RACH configuration selector 615 may determine to switch from using the UE-specific RACH procedure configuration to using the wireless backhaul-specific RACH procedure configuration, where a power ramping counter is not reset upon switching. In some examples, the RACH configuration selector 615 may select the UE-specific RACH procedure configuration based on an information element in a DCI transmission ordering the RACH procedure, where the information element indicates that the first wireless node should use the UE-specific RACH procedure configuration.

Figure 7:
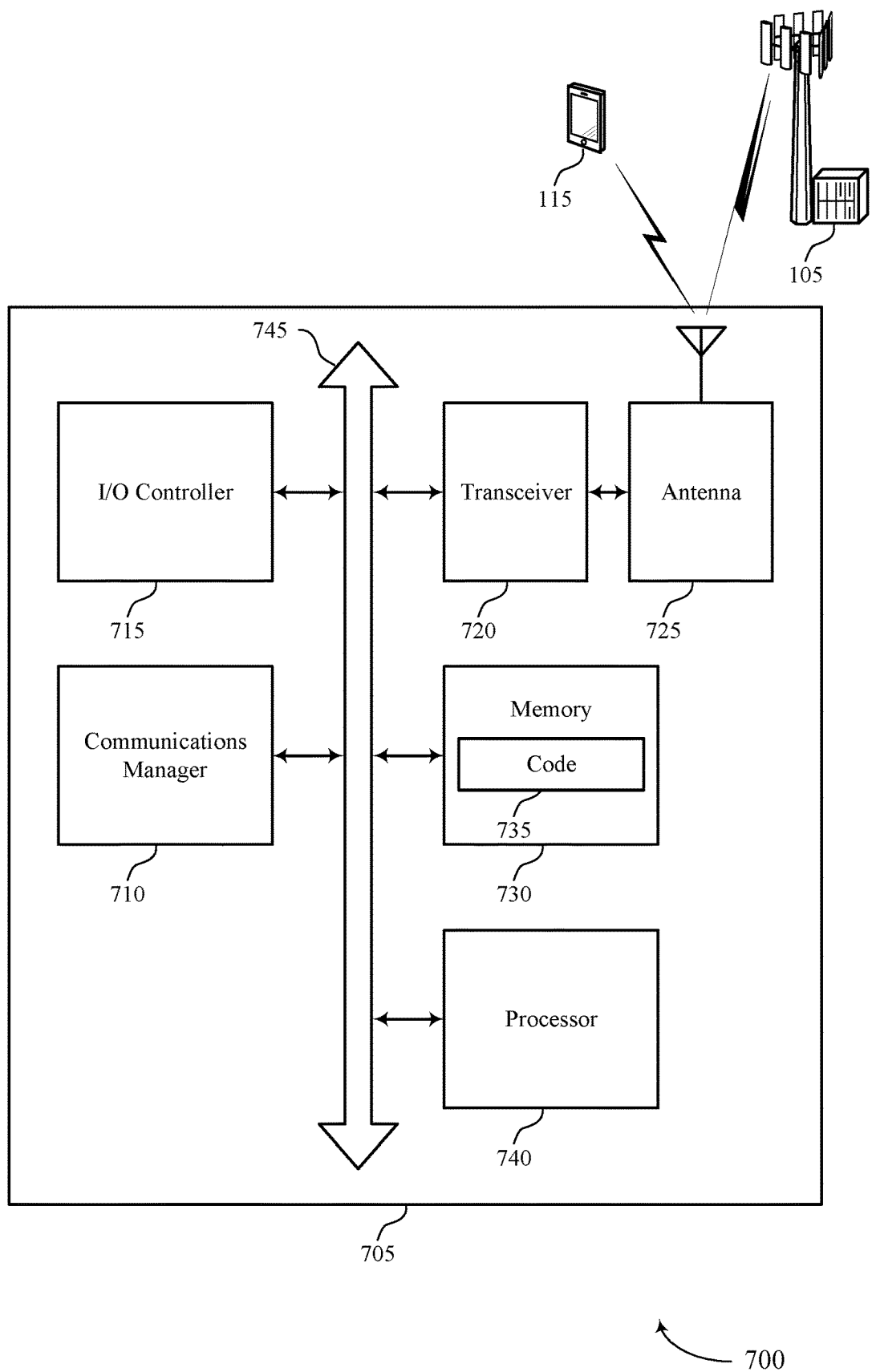
FIG. 7 shows a diagram of a system including a device that supports RACH procedure selection by an IAB node in accordance with aspects of the present disclosure.

FIG. 7 shows a diagram of a system 700 including a device 705 that supports RACH procedure selection by an IAB node in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a parent base station, system information that indicates a UE-specific RACH procedure configuration and a wireless backhaul-specific RACH procedure configuration, where the first wireless node is a wireless backhaul node to the parent base station, determine to use the UE-specific RACH procedure configuration for communicating with the parent base station, and perform a RACH procedure with the parent base station in accordance with the UE-specific RACH procedure configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting RACH procedure selection by an IAB node).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The communications manager 710 as described herein may be implemented to realize one or more potential advantages. One implementation may allow the device 705 to more efficiently perform RACH procedure with a parent node. For example, a device 705 may be configured to determine whether the device 705 may use a UE-specific RACH procedure or an IAB-specific RACH procedure. If device 705 is able to use either RACH procedure, device 705 may determine which RACH procedure to use to decrease latency associated with performing the RACH procedure.

Figure 8:
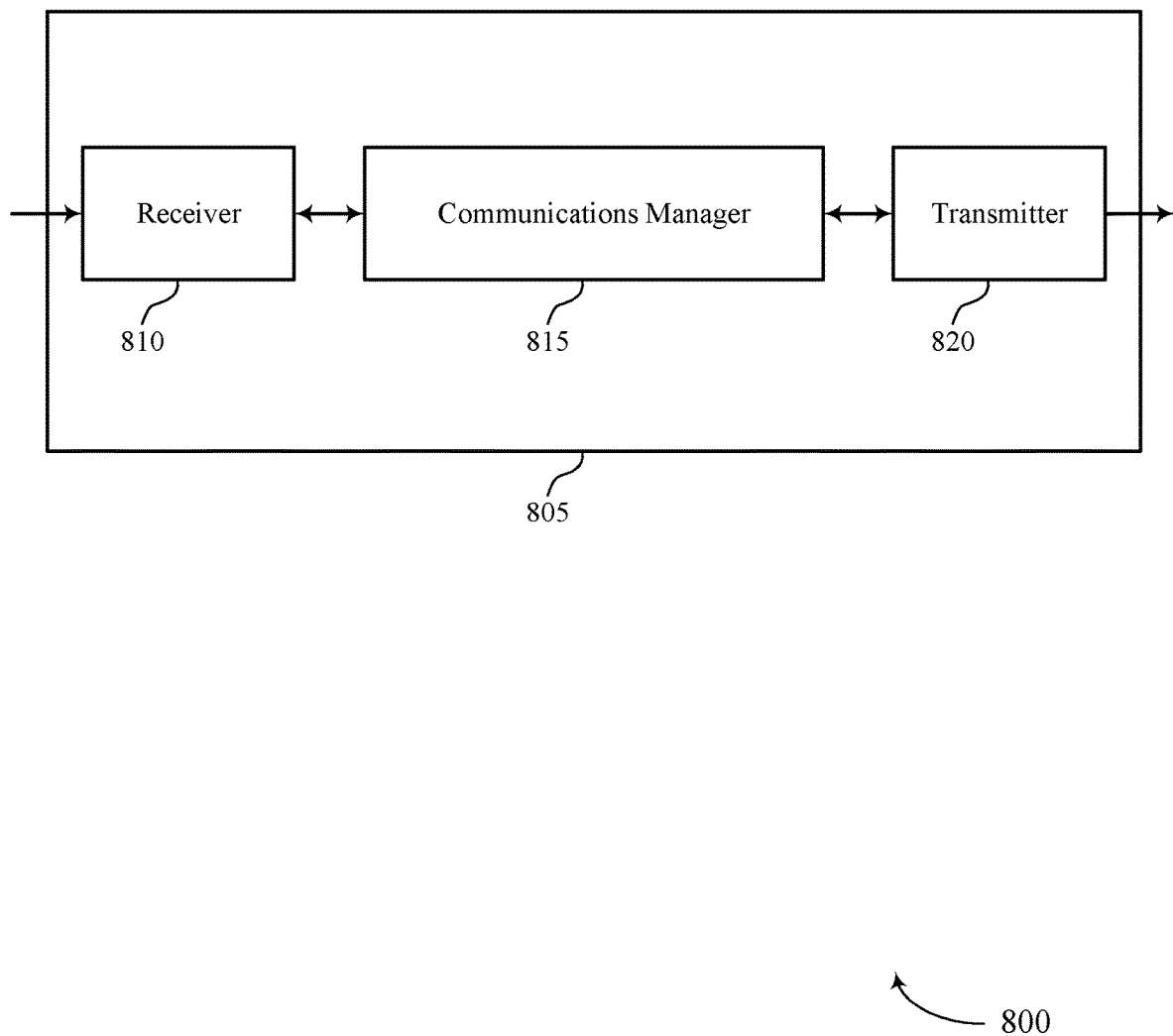
FIGS. 8 and 9 show block diagrams of devices that support RACH procedure selection by an IAB node in accordance with aspects of the present disclosure.

FIG. 8 shows a block diagram 800 of a device 805 that supports RACH procedure selection by an IAB node in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to RACH procedure selection by an IAB node, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a first wireless node, system information that indicates a UE-specific RACH procedure configuration and a wireless backhaul-specific RACH procedure configuration, where the first wireless node is a wireless backhaul node to the parent base station, determine that the UE-specific RACH procedure configuration is being used by the first wireless node for communicating with the parent base station, and perform a RACH procedure with the first wireless node in accordance with the UE-specific RACH procedure configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
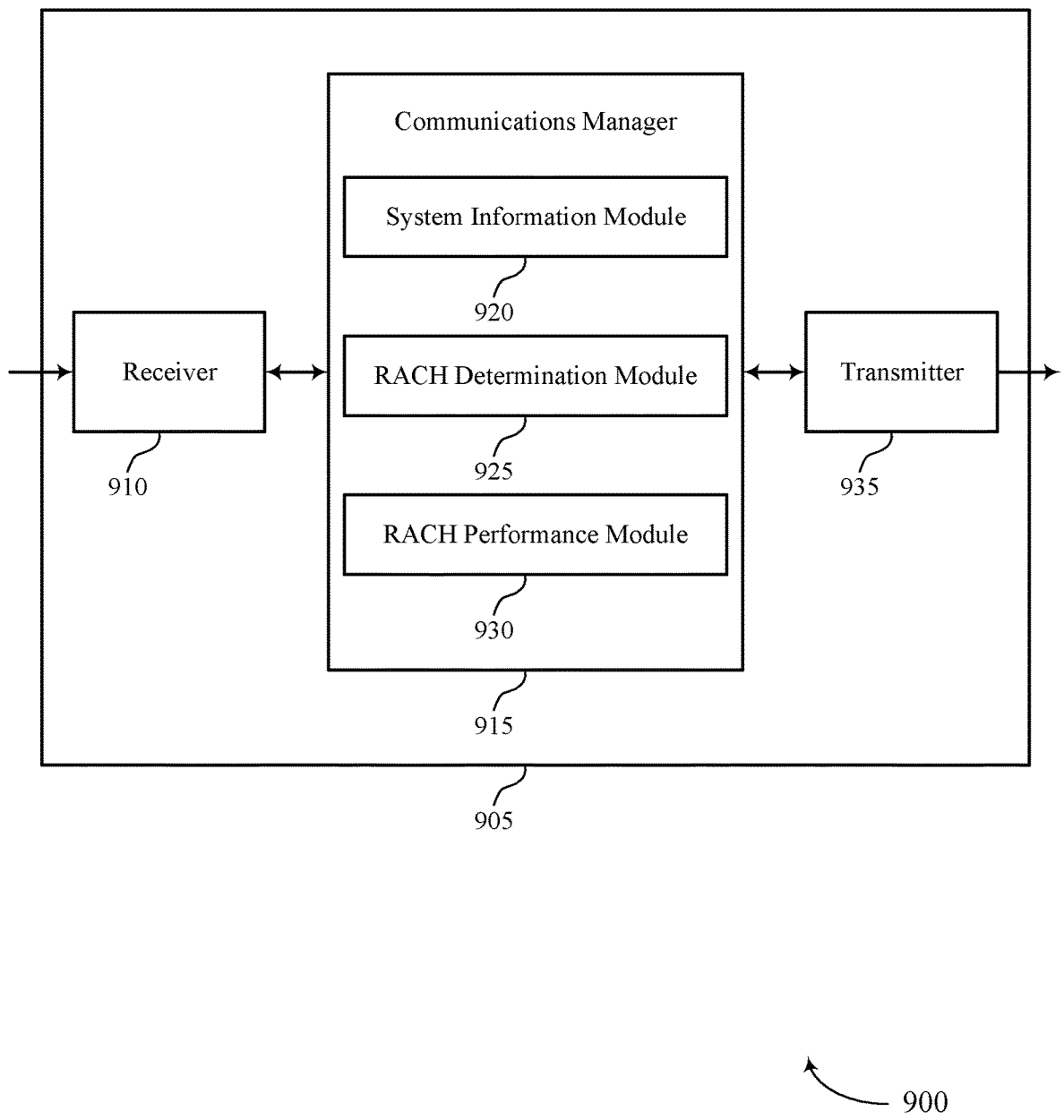

By including or configuring the communications manager 820 in accordance with examples as described herein, the device 820 may support techniques for improved communication reliability, reduced latency, more efficient utilization of communication resources, and improved coordination between devices. FIG. 9 shows a block diagram 900 of a device 905 that supports RACH procedure selection by an IAB node in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to RACH procedure selection by an IAB node, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a system information module 920, a RACH determination module 925, and a RACH performance module 930. The communications manager 915 may be an example of aspects of the communications manager 1110 described herein.

The system information module 920 may transmit, to a first wireless node, system information that indicates a UE-specific RACH procedure configuration and a wireless backhaul-specific RACH procedure configuration, where the first wireless node is a wireless backhaul node to the parent base station. The RACH determination module 925 may determine that the UE-specific RACH procedure configuration is being used by the first wireless node for communicating with the parent base station. The RACH performance module 930 may perform a RACH procedure with the first wireless node in accordance with the UE-specific RACH procedure configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
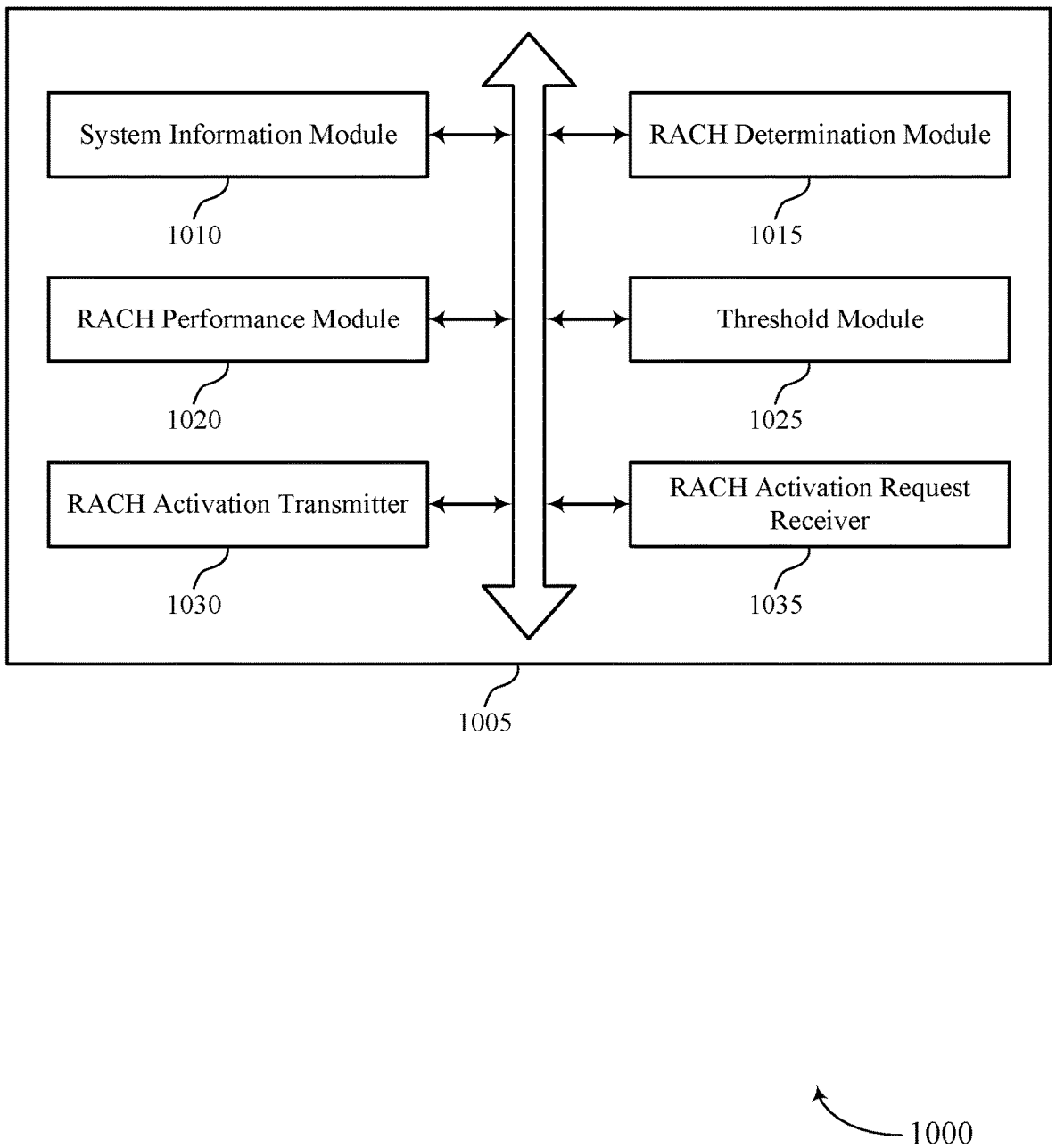
FIG. 10 shows a block diagram of a communications manager that supports RACH procedure selection by an IAB node in accordance with aspects of the present disclosure.

FIG. 10 shows a block diagram 1000 of a communications manager 1005 that supports RACH procedure selection by an IAB node in accordance with aspects of the present disclosure. The communications manager 1005 may be an example of aspects of a communications manager 815, a communications manager 915, or a communications manager 1110 described herein. The communications manager 1005 may include a system information module 1010, a RACH determination module 1015, a RACH performance module 1020, a threshold module 1025, a RACH activation transmitter 1030, and a RACH activation request receiver 1035. Each of these modules may communicate, directly or indirectly, with one another (e.g., via one or more buses).

The system information module 1010 may transmit, to a first wireless node, system information that indicates a UE-specific RACH procedure configuration and a wireless backhaul-specific RACH procedure configuration, where the first wireless node is a wireless backhaul node to the parent base station. The RACH determination module 1015 may determine that the UE-specific RACH procedure configuration is being used by the first wireless node for communicating with the parent base station. The RACH performance module 1020 may perform a RACH procedure with the first wireless node in accordance with the UE-specific RACH procedure configuration. In some cases, the first wireless node is an IAB node.

The threshold module 1025 may determine one or more measurement thresholds for the first wireless node to use in determining whether to use the UE-specific RACH procedure configuration. In some examples, the threshold module 1025 may transmit, to the first wireless node, an indication of the one or more measurement thresholds.

In some cases, one of the one or more measurement thresholds is an RSRP associated with communications with the first wireless node. In some cases, one of the one or more measurement thresholds is a variation over time of an RSRP or a CQI associated with communications with the first wireless node. In some cases, one of the one or more measurement thresholds is a RTT associated with communications with the first wireless node.

In some cases, the one or more measurement thresholds are different for different classes of wireless nodes, where the classes of wireless nodes includes a mobile wireless backhaul node, a static wireless backhaul node, a wide-area wireless backhaul node, and a local-area wireless backhaul node. In some cases, the indication of the one or measurement thresholds is transmitted via a SIB transmission. In some cases, the indication of the one or measurement thresholds is transmitted via a unicast transmission, the unicast transmission including an F1 application protocol transmission, RRC transmission, MAC-CE transmission, DCI transmission, or a combination thereof.

The RACH activation transmitter 1030 may transmit signaling, to the first wireless node, activating the UE-specific RACH procedure configuration for communicating with the first wireless node. In some examples, the RACH activation transmitter 1030 may transmit DCI, a MAC-CE, RRC signaling, or a combination thereof. The RACH activation request receiver 1035 may receive, from the first wireless node, a message requesting the UE-specific RACH procedure configuration be activated, where transmission of the signaling activating the UE-specific RACH procedure configuration is based on the request. In some cases, the request is received in an UCI transmission, MAC-CE transmission, F1 application protocol transmission, or RRC transmission, or a combination thereof.

In some examples, the RACH determination module 1015 may determine that the first wireless node is a mobile wireless backhaul node, where the UE-specific RACH procedure configuration is used based on the first wireless node being a mobile wireless backhaul node. In some examples, the RACH determination module 1015 may transmit an information element in a DCI transmission ordering the RACH procedure, where the information element indicates that the first wireless node should use the UE-specific RACH procedure configuration.

Figure 11:
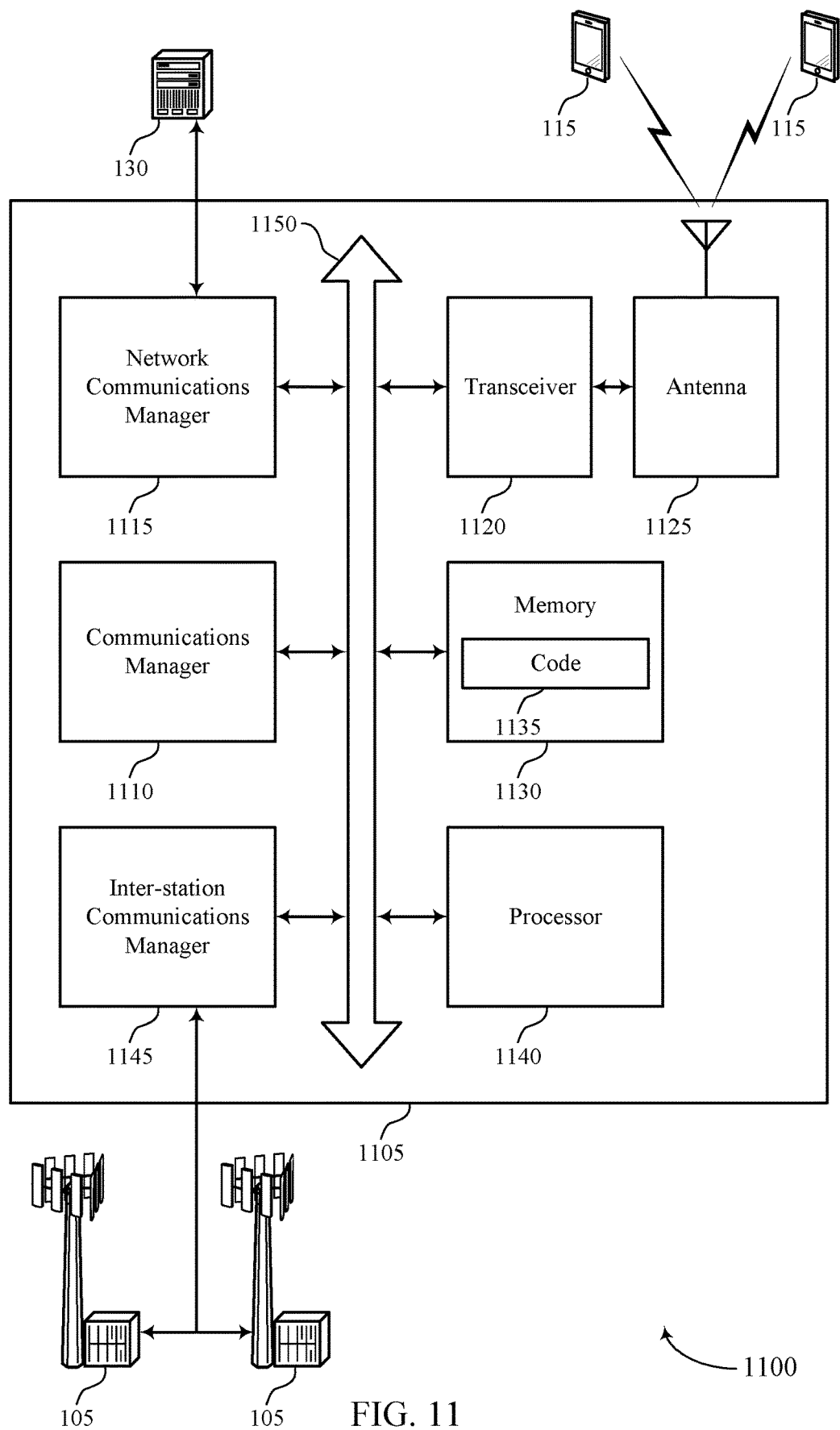
FIG. 11 shows a diagram of a system including a device that supports RACH procedure selection by an IAB node in accordance with aspects of the present disclosure.

FIG. 11 shows a diagram of a system 1100 including a device 1105 that supports RACH procedure selection by an IAB node in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a first wireless node, system information that indicates a UE-specific RACH procedure configuration and a wireless backhaul-specific RACH procedure configuration, where the first wireless node is a wireless backhaul node to the parent base station, determine that the UE-specific RACH procedure configuration is being used by the first wireless node for communicating with the parent base station, and perform a RACH procedure with the first wireless node in accordance with the UE-specific RACH procedure configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting RACH procedure selection by an IAB node).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the communications manager 1135 in accordance with examples as described herein, the device 1135 may support techniques for improved communication reliability, reduced latency, more efficient utilization of communication resources, and improved coordination between devices.

Figure 12:
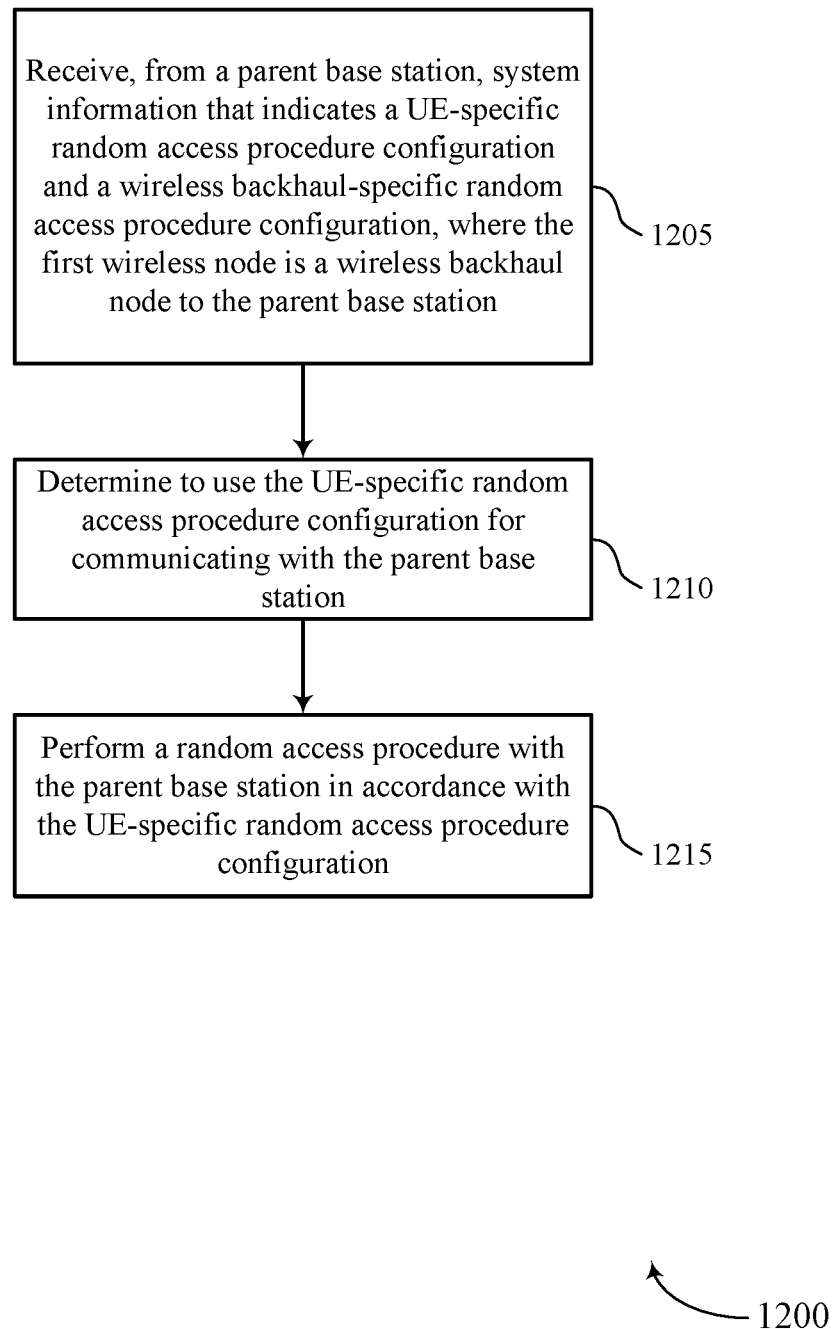
FIGS. 12 through 15 show flowcharts illustrating methods that support RACH procedure selection by an IAB node in accordance with aspects of the present disclosure.

FIG. 12 shows a flowchart illustrating a method 1200 that supports RACH procedure selection by an IAB node in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a parent base station, system information that indicates a UE-specific RACH procedure configuration and a wireless backhaul-specific RACH procedure configuration, where the first wireless node is a wireless backhaul node to the parent base station. The operations of 1205 may be performed according to the methods described herein. In some examples, aspects of the operations of 1205 may be performed by a system information manager as described with reference to FIGS. 4 through 7.

At 1210, the UE may determine to use the UE-specific RACH procedure configuration for communicating with the parent base station. The operations of 1210 may be performed according to the methods described herein. In some examples, aspects of the operations of 1210 may be performed by a RACH configuration selector as described with reference to FIGS. 4 through 7.

At 1215, the UE may perform a RACH procedure with the parent base station in accordance with the UE-specific RACH procedure configuration. The operations of 1215 may be performed according to the methods described herein. In some examples, aspects of the operations of 1215 may be performed by a RACH performance manager as described with reference to FIGS. 4 through 7.

Figure 13:
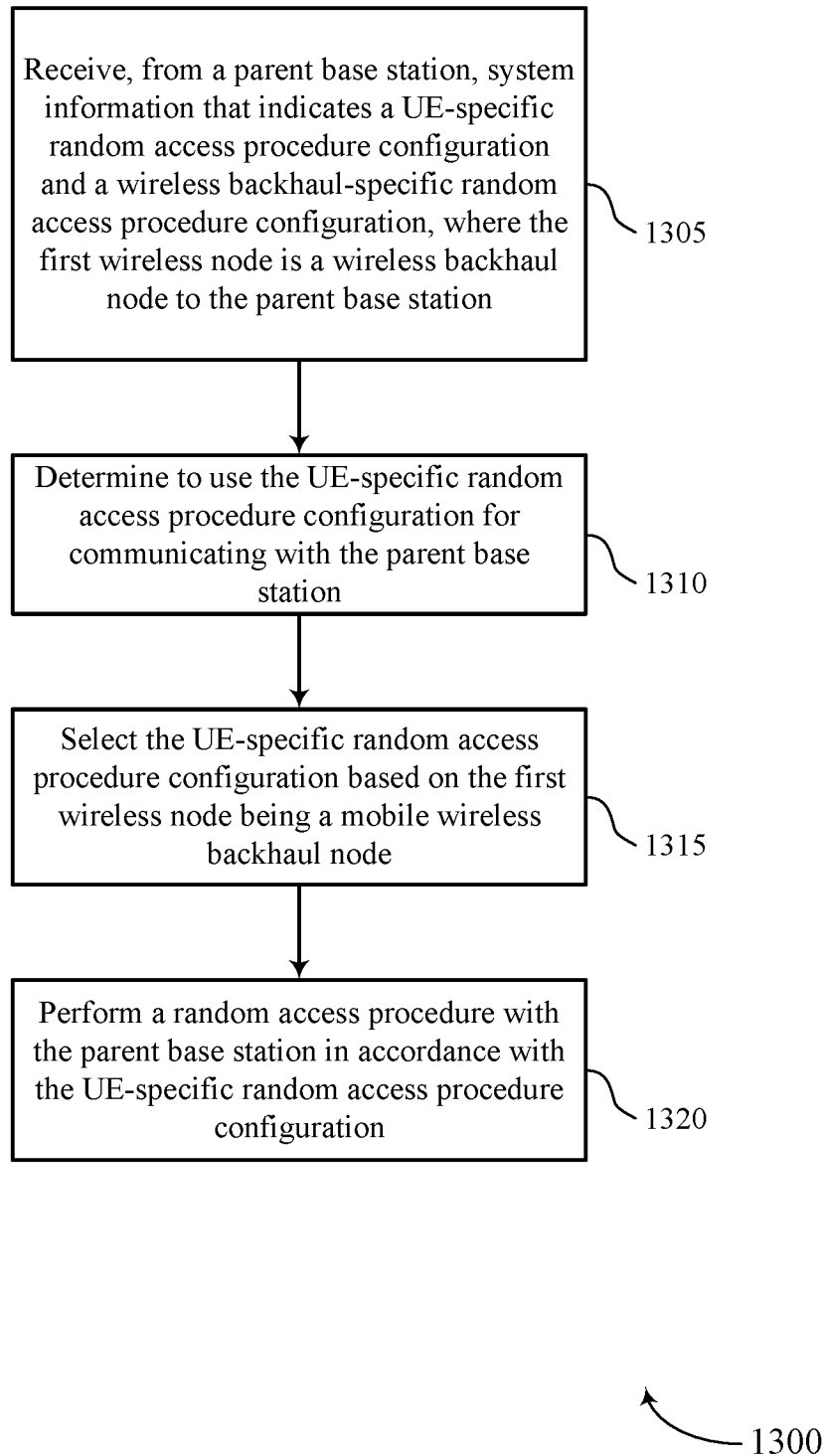

FIG. 13 shows a flowchart illustrating a method 1300 that supports RACH procedure selection by an IAB node in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a parent base station, system information that indicates a UE-specific RACH procedure configuration and a wireless backhaul-specific RACH procedure configuration, where the first wireless node is a wireless backhaul node to the parent base station. The operations of 1305 may be performed according to the methods described herein. In some examples, aspects of the operations of 1305 may be performed by a system information manager as described with reference to FIGS. 4 through 7.

At 1310, the UE may determine to use the UE-specific RACH procedure configuration for communicating with the parent base station. The operations of 1310 may be performed according to the methods described herein. In some examples, aspects of the operations of 1310 may be performed by a RACH configuration selector as described with reference to FIGS. 4 through 7.

At 1315, the UE may select the UE-specific RACH procedure configuration based on the first wireless node being a mobile wireless backhaul node. The operations of 1315 may be performed according to the methods described herein. In some examples, aspects of the operations of 1315 may be performed by a RACH configuration selector as described with reference to FIGS. 4 through 7.

At 1320, the UE may perform a RACH procedure with the parent base station in accordance with the UE-specific RACH procedure configuration. The operations of 1320 may be performed according to the methods described herein. In some examples, aspects of the operations of 1320 may be performed by a RACH performance manager as described with reference to FIGS. 4 through 7.

Figure 14:
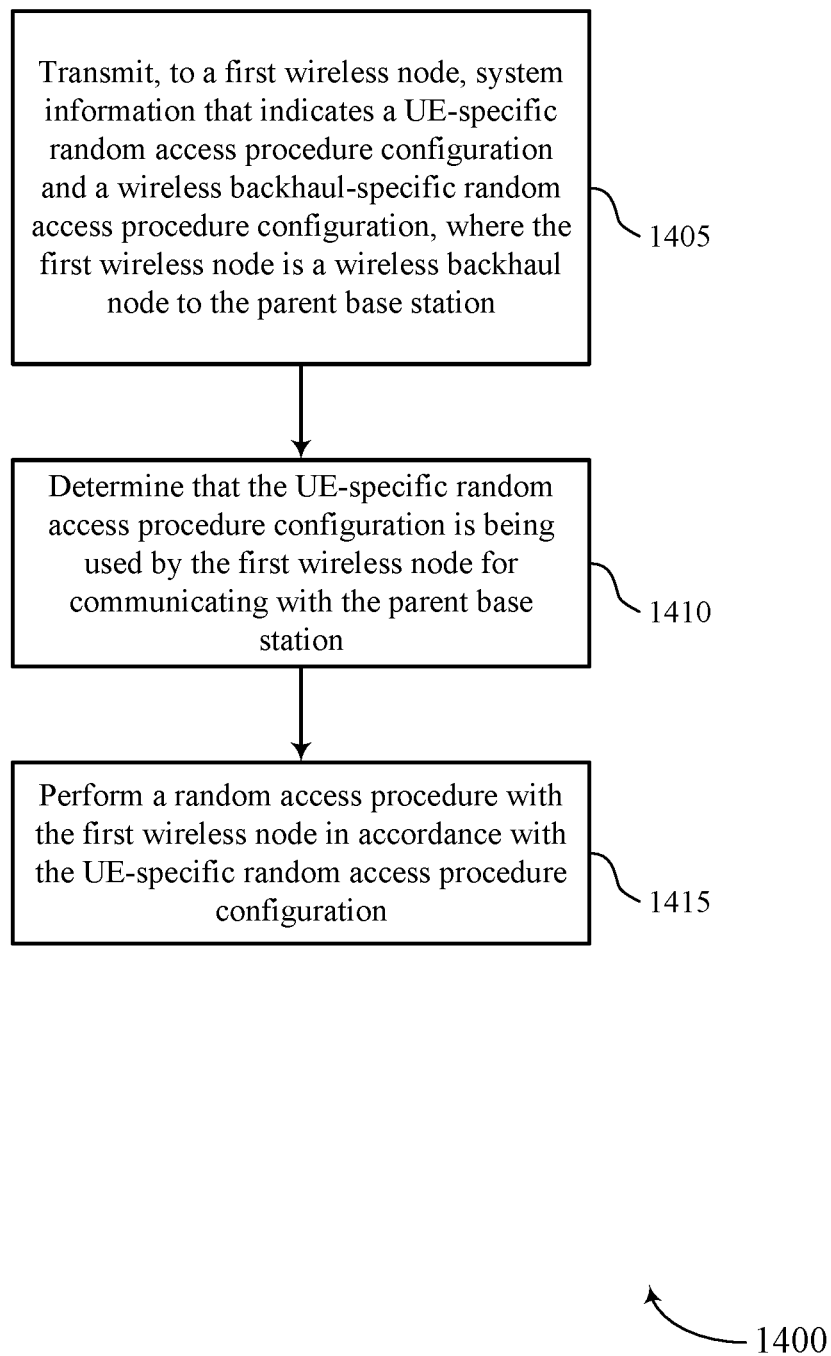

FIG. 14 shows a flowchart illustrating a method 1400 that supports RACH procedure selection by an IAB node in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, to a first wireless node, system information that indicates a UE-specific RACH procedure configuration and a wireless backhaul-specific RACH procedure configuration, where the first wireless node is a wireless backhaul node to the parent base station. The operations of 1405 may be performed according to the methods described herein. In some examples, aspects of the operations of 1405 may be performed by a system information module as described with reference to FIGS. 8 through 11.

At 1410, the base station may determine that the UE-specific RACH procedure configuration is being used by the first wireless node for communicating with the parent base station. The operations of 1410 may be performed according to the methods described herein. In some examples, aspects of the operations of 1410 may be performed by a RACH determination module as described with reference to FIGS. 8 through 11.

At 1415, the base station may perform a RACH procedure with the first wireless node in accordance with the UE-specific RACH procedure configuration. The operations of 1415 may be performed according to the methods described herein. In some examples, aspects of the operations of 1415 may be performed by a RACH performance module as described with reference to FIGS. 8 through 11.

Figure 15:
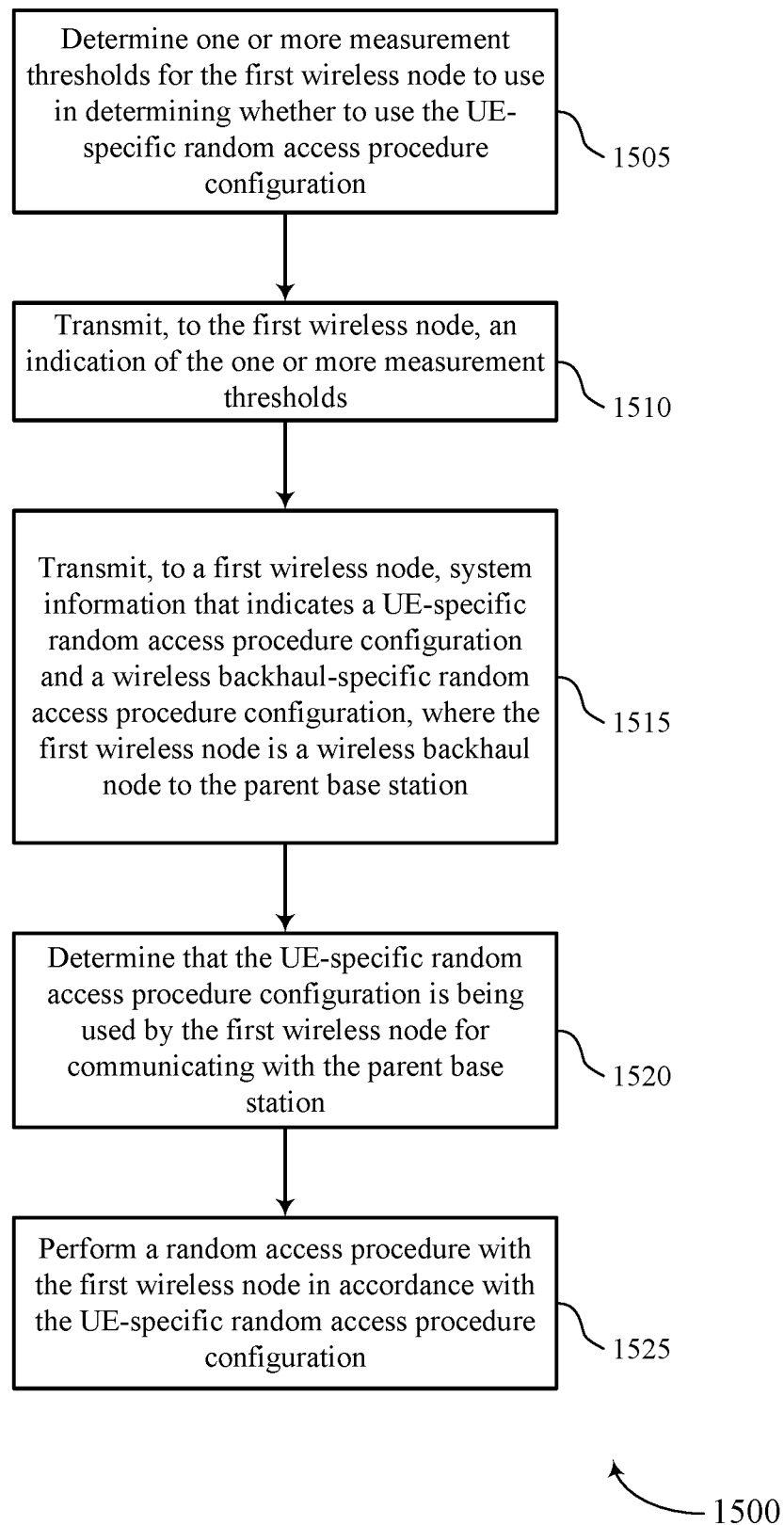

FIG. 15 shows a flowchart illustrating a method 1500 that supports RACH procedure selection by an IAB node in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may determine one or more measurement thresholds for the first wireless node to use in determining whether to use the UE-specific RACH procedure configuration. The operations of 1505 may be performed according to the methods described herein. In some examples, aspects of the operations of 1505 may be performed by a threshold module as described with reference to FIGS. 8 through 11.

At 1510, the base station may transmit, to the first wireless node, an indication of the one or more measurement thresholds. The operations of 1510 may be performed according to the methods described herein. In some examples, aspects of the operations of 1510 may be performed by a threshold module as described with reference to FIGS. 8 through 11.

At 1515, the base station may transmit, to a first wireless node, system information that indicates a UE-specific RACH procedure configuration and a wireless backhaul-specific RACH procedure configuration, where the first wireless node is a wireless backhaul node to the parent base station. The operations of 1515 may be performed according to the methods described herein. In some examples, aspects of the operations of 1515 may be performed by a system information module as described with reference to FIGS. 8 through 11.

At 1520, the base station may determine that the UE-specific RACH procedure configuration is being used by the first wireless node for communicating with the parent base station. The operations of 1520 may be performed according to the methods described herein. In some examples, aspects of the operations of 1520 may be performed by a RACH determination module as described with reference to FIGS. 8 through 11.

At 1525, the base station may perform a RACH procedure with the first wireless node in accordance with the UE-specific RACH procedure configuration. The operations of 1525 may be performed according to the methods described herein. In some examples, aspects of the operations of 1525 may be performed by a RACH performance module as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first wireless node, comprising: receiving, from a parent base station, system information that indicates a UE-specific random access procedure configuration and a wireless backhaul-specific random access procedure configuration, wherein the first wireless node is a wireless backhaul node to the parent base station; determining to use the UE-specific random access procedure configuration for communicating with the parent base station; and performing a random access procedure with the parent base station in accordance with the UE-specific random access procedure configuration.

Aspect 2: The method of aspect 1, wherein determining to use the UE-specific random access procedure configuration comprises: selecting the UE-specific random access procedure configuration based at least in part on the first wireless node being a mobile wireless backhaul node.

Aspect 3: The method of aspect 2, wherein selecting the UE-specific random access procedure configuration further comprises: determining that a next UE-specific random access occasion occurs prior to a next wireless backhaul-specific random access occasion; and selecting the UE-specific random access procedure configuration based at least in part on the next UE-specific random access occasion occurring before the next wireless backhaul-specific random access occasion.

Aspect 4: The method of any of aspects 1 through 3, wherein determining to use the UE-specific random access procedure configuration comprises: selecting the UE-specific random access procedure configuration based at least in part on satisfaction of one or more measurement thresholds.

Aspect 5: The method of aspect 4, wherein selecting the UE-specific random access procedure configuration further comprises: determining a reference signal receive power associated with communications with the parent base station; identifying that the determined reference signal receive power exceeds a threshold reference signal receive power from the one or more measurement thresholds; and selecting the UE-specific random access procedure configuration based at least in part on the identifying.

Aspect 6: The method of any of aspects 4 through 5, wherein selecting the UE-specific random access procedure configuration further comprises: determining a variation over time of a reference signal receive power or a channel quality indicator associated with communications with the parent base station; identifying that the determined variation exceeds a respective threshold reference signal receive power variation or threshold channel quality indicator variation from the one or more measurement thresholds; and selecting the UE-specific random access procedure configuration based at least in part on the identifying.

Aspect 7: The method of any of aspects 4 through 6, wherein selecting the UE-specific random access procedure configuration further comprises: determining a round trip time associated with communications with the parent base station; identifying that the determined round trip time is less than a threshold round trip time from the one or more measurement thresholds; and selecting the UE-specific random access procedure configuration based at least in part on the identifying.

Aspect 8: The method of any of aspects 4 through 7, wherein selecting the UE-specific random access procedure configuration further comprises: determining a variation in round trip time associated with communications with the parent base station; identifying that the determined variation round trip time exceeds a threshold variation round trip time from the one or more measurement thresholds; and selecting the UE-specific random access procedure configuration based at least in part on the identifying.

Aspect 9: The method of any of aspects 4 through 8, wherein the one or more measurement thresholds are different for different classes of wireless nodes, the classes of wireless nodes comprises a mobile wireless backhaul node, a static wireless backhaul node, a wide-area wireless backhaul node, and a local-area wireless backhaul node.

Aspect 10: The method of any of aspects 4 through 9, further comprising: receiving, from the parent base station, the one or more measurement thresholds via a system information block transmission.

Aspect 11: The method of any of aspects 4 through 10, further comprising: receiving, from the parent base station, the one or more measurement thresholds via a unicast transmission, the unicast transmission comprising an F1 application protocol transmission, radio resource control transmission, medium access control (MAC) control element transmission, downlink control information transmission, or a combination thereof.

Aspect 12: The method of any of aspects 1 through 11, wherein determining to use the UE-specific random access procedure configuration comprises: identifying that a quantity of random access attempts using the wireless backhaul-specific random access procedure configuration exceeds a threshold quantity of attempts; and selecting the UE-specific random access procedure configuration based at least in part on the identifying.

Aspect 13: The method of any of aspects 1 through 12, further comprising: attempting to perform the random access procedure with the parent base station in accordance with the UE-specific random access procedure configuration; identifying that a quantity of random access attempts using the UE-specific random access procedure configuration exceeds a threshold quantity of attempts; and determining to switch from using the UE-specific random access procedure configuration to using the wireless backhaul-specific random access procedure configuration based at least in part on the identifying.

Aspect 14: The method of any of aspects 1 through 13, wherein determining to use the UE-specific random access procedure configuration comprises: receiving signaling, from the parent base station, activating the UE-specific random access procedure configuration for communicating with the parent base station.

Aspect 15: The method of aspect 14, wherein receiving the signaling activating the UE-specific random access procedure configuration further comprises: receiving downlink control information, a media access control-(MAC) control element, radio resource control signaling, or a combination thereof.

Aspect 16: The method of any of aspects 14 through 15, further comprising: transmitting, to the parent base station, a message requesting the UE-specific random access procedure configuration be activated, wherein receipt of the signaling activating the UE-specific random access procedure configuration is based at least in part on the request.

Aspect 17: The method of aspect 16, wherein the request is transmitted in an uplink control information transmission, medium access control (MAC) control element transmission, F1 application protocol transmission, or radio resource control transmission, or a combination thereof.

Aspect 18: The method of any of aspects 1 through 17, further comprising: determining to switch from using the UE-specific random access procedure configuration to using the wireless backhaul-specific random access procedure configuration, wherein a power ramping counter is not reset upon switching.

Aspect 19: The method of any of aspects 1 through 18, wherein determining to use the UE-specific random access procedure configuration comprises: selecting the UE-specific random access procedure configuration based at least in part on an information element in a downlink control information transmission ordering the random access procedure, wherein the information element indicates that the first wireless node should use the UE-specific random access procedure configuration.

Aspect 20: The method of any of aspects 1 through 19, wherein the first wireless node is an integrated access backhaul node.

Aspect 21: A method for wireless communications at a parent base station, comprising: transmitting, to a first wireless node, system information that indicates a UE-specific random access procedure configuration and a wireless backhaul-specific random access procedure configuration, wherein the first wireless node is a wireless backhaul node to the parent base station; determining that the UE-specific random access procedure configuration is being used by the first wireless node for communicating with the parent base station; and performing a random access procedure with the first wireless node in accordance with the UE-specific random access procedure configuration.

Aspect 22: The method of aspect 21, wherein determining that the UE-specific random access procedure configuration is being used comprises: determining that the first wireless node is a mobile wireless backhaul node, wherein the UE-specific random access procedure configuration is used based at least in part on the first wireless node being a mobile wireless backhaul node.

Aspect 23: The method of any of aspects 21 through 22, further comprising: determining one or more measurement thresholds for the first wireless node to use in determining whether to use the UE-specific random access procedure configuration; and transmitting, to the first wireless node, an indication of the one or more measurement thresholds.

Aspect 24: The method of aspect 23, wherein one of the one or more measurement thresholds is a reference signal receive power associated with communications with the first wireless node.

Aspect 25: The method of any of aspects 23 through 24, wherein one of the one or more measurement thresholds is a variation over time of a reference signal receive power or a channel quality indicator associated with communications with the first wireless node.

Aspect 26: The method of any of aspects 23 through 25, wherein one of the one or more measurement thresholds is a round trip time associated with communications with the first wireless node.

Aspect 27: The method of any of aspects 23 through 26, wherein the one or more measurement thresholds are different for different classes of wireless nodes, the classes of wireless nodes comprises a mobile wireless backhaul node, a static wireless backhaul node, a wide-area wireless backhaul node, and a local-area wireless backhaul node.

Aspect 28: The method of any of aspects 23 through 27, wherein the indication of the one or measurement thresholds is transmitted via a system information block transmission.

Aspect 29: The method of any of aspects 23 through 28, wherein the indication of the one or measurement thresholds is transmitted via a unicast transmission, the unicast transmission comprising an F1 application protocol transmission, radio resource control transmission, medium access control (MAC) control element transmission, downlink control information transmission, or a combination thereof.

Aspect 30: The method of any of aspects 21 through 29, wherein determining that the UE-specific random access procedure configuration is being used comprises: transmitting signaling, to the first wireless node, activating the UE-specific random access procedure configuration for communicating with the first wireless node.

Aspect 31: The method of aspect 30, wherein transmitting the signaling activating the UE-specific random access procedure configuration further comprises: transmitting downlink control information, a media access control-(MAC) control element, radio resource control signaling, or a combination thereof.

Aspect 32: The method of any of aspects 30 through 31, further comprising: receiving, from the first wireless node, a message requesting the UE-specific random access procedure configuration be activated, wherein transmission of the signaling activating the UE-specific random access procedure configuration is based at least in part on the request.

Aspect 33: The method of aspect 32, wherein the request is received in an uplink control information transmission, medium access control (MAC) control element transmission, F1 application protocol transmission, or radio resource control transmission, or a combination thereof.

Aspect 34: The method of any of aspects 21 through 33, wherein determining that the UE-specific random access procedure configuration is being used comprises: transmitting an information element in a downlink control information transmission ordering the random access procedure, wherein the information element indicates that the first wireless node should use the UE-specific random access procedure configuration.

Aspect 35: The method of any of aspects 21 through 34, wherein the first wireless node is an integrated access backhaul node.

Aspect 36: An apparatus for wireless communications at a first wireless node, comprising a processor; memory coupled with the processor; and instructions stored in the memory and executable by the processor to cause the apparatus to perform a method of any of aspects 1 through 20.

Aspect 37: An apparatus for wireless communications at a first wireless node, comprising at least one means for performing a method of any of aspects 1 through 20.

Aspect 38: A non-transitory computer-readable medium storing code for wireless communications at a first wireless node, the code comprising instructions executable by a processor to perform a method of any of aspects 1 through 20.

Aspect 39: An apparatus for wireless communications at a parent base station, comprising a processor; memory coupled with the processor; and instructions stored in the memory and executable by the processor to cause the apparatus to perform a method of any of aspects 21 through 35.

Aspect 40: An apparatus for wireless communications at a parent base station, comprising at least one means for performing a method of any of aspects 21 through 35.

Aspect 41: A non-transitory computer-readable medium storing code for wireless communications at a parent base station, the code comprising instructions executable by a processor to perform a method of any of aspects 21 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless node, comprising:
   receiving, from a parent network entity, a system information message that indicates a plurality of random access procedure configurations for performance of a random access procedure between the first wireless node and the parent network entity, the plurality of random access procedure configurations comprising at least a user equipment (UE)-specific random access procedure configuration and a wireless backhaul-specific random access procedure configuration, wherein the first wireless node is a mobile wireless backhaul node to the parent network entity;
   selecting the UE-specific random access procedure configuration based at least in part on the first wireless node being the mobile wireless backhaul node; and
   performing the random access procedure with the parent network entity in accordance with the selected UE-specific random access procedure configuration.

2. The method of claim 1, wherein selecting the UE-specific random access procedure configuration further comprises:
   determining that a next UE-specific random access occasion occurs prior to a next wireless backhaul-specific random access occasion; and
   selecting the UE-specific random access procedure configuration based at least in part on the next UE-specific random access occasion occurring before the next wireless backhaul-specific random access occasion.

3. The method of claim 1, wherein selecting the UE-specific random access procedure configuration further comprises:
   selecting the UE-specific random access procedure configuration based at least in part on satisfaction of one or more measurement thresholds.

4. The method of claim 3, wherein selecting the UE-specific random access procedure configuration further comprises:
   determining a reference signal receive power associated with communications with the parent network entity;
   identifying that the determined reference signal receive power exceeds a threshold reference signal receive power from the one or more measurement thresholds; and
   selecting the UE-specific random access procedure configuration based at least in part on the identifying.

5. The method of claim 3, wherein selecting the UE-specific random access procedure configuration further comprises:
   determining a variation over time of a reference signal receive power or a channel quality indicator associated with communications with the parent network entity;
   identifying that the determined variation exceeds a respective threshold reference signal receive power variation or threshold channel quality indicator variation from the one or more measurement thresholds; and
   selecting the UE-specific random access procedure configuration based at least in part on the identifying.

6. The method of claim 3, wherein selecting the UE-specific random access procedure configuration further comprises:
   determining a round trip time associated with communications with the parent network entity;
   identifying that the determined round trip time is less than a threshold round trip time from the one or more measurement thresholds; and
   selecting the UE-specific random access procedure configuration based at least in part on the identifying.

7. The method of claim 3, wherein selecting the UE-specific random access procedure configuration further comprises:
   determining a variation in round trip time associated with communications with the parent network entity;
   identifying that the determined variation in round trip time exceeds a threshold variation round trip time from the one or more measurement thresholds; and
   selecting the UE-specific random access procedure configuration based at least in part on the identifying.

8. The method of claim 3, wherein the one or more measurement thresholds are different for different classes of wireless nodes, wherein the classes of wireless nodes comprise the mobile wireless backhaul node, a static wireless backhaul node, a wide-area wireless backhaul node, and a local-area wireless backhaul node.

9. The method of claim 3, further comprising:
   receiving, from the parent network entity, the one or more measurement thresholds via a system information block transmission.

10. The method of claim 3, further comprising:
    receiving, from the parent network entity, the one or more measurement thresholds via a unicast transmission, the unicast transmission comprising an F1 application protocol transmission, radio resource control transmission, medium access control (MAC) control element transmission, downlink control information transmission, or a combination thereof.

11. The method of claim 1, further comprising:
    identifying that a quantity of random access attempts using the wireless backhaul-specific random access procedure configuration exceeds a threshold quantity of attempts; and
    selecting the UE-specific random access procedure configuration based at least in part on the identifying.

12. The method of claim 1, further comprising:
    attempting to perform the random access procedure with the parent network entity in accordance with the UE-specific random access procedure configuration;
    identifying that a quantity of random access attempts using the UE-specific random access procedure configuration exceeds a threshold quantity of attempts; and
    determining to switch from using the UE-specific random access procedure configuration to using the wireless backhaul-specific random access procedure configuration based at least in part on the identifying.

13. The method of claim 1, further comprising:
    receiving signaling, from the parent network entity, activating the UE-specific random access procedure configuration for communicating with the parent network entity.

14. The method of claim 13, wherein receiving the signaling activating the UE-specific random access procedure configuration further comprises:
receiving downlink control information, a media access control-(MAC) control element, radio resource control signaling, or a combination thereof.

15. The method of claim 13, further comprising:
transmitting, to the parent network entity, a message requesting the UE-specific random access procedure configuration be activated, wherein receipt of the signaling activating the UE-specific random access procedure configuration is based at least in part on the request.

16. The method of claim 15, wherein the request is transmitted in an uplink control information transmission, medium access control (MAC) control element transmission, F1 application protocol transmission, or radio resource control transmission, or a combination thereof.

17. The method of claim 1, further comprising:
determining to switch from using the UE-specific random access procedure configuration to using the wireless backhaul-specific random access procedure configuration, wherein a power ramping counter is not reset upon switching.

18. The method of claim 1, wherein selecting the UE-specific random access procedure configuration further comprises:
selecting the UE-specific random access procedure configuration based at least in part on an information element in a downlink control information transmission ordering the random access procedure, wherein the information element indicates that the first wireless node should use the UE-specific random access procedure configuration.

19. The method of claim 1, wherein the first wireless node is an integrated access backhaul node.

20. A method for wireless communications at a parent network entity, comprising:
transmitting, to a first wireless node, a system information message that indicates a plurality of random access procedure configurations for performance of a random access procedure between the parent network entity and the first wireless node, the plurality of random access procedure configurations comprising at least a user equipment (UE)-specific random access procedure configuration and a wireless backhaul-specific random access procedure configuration, wherein the first wireless node is a mobile wireless backhaul node to the parent network entity; and
performing the random access procedure with the first wireless node in accordance with the UE-specific random access procedure configuration based at least in part on the first wireless node being the mobile wireless backhaul node.

21. The method of claim 20, further comprising:
determining one or more measurement thresholds for the first wireless node to use in determining whether to use the UE-specific random access procedure configuration; and
transmitting, to the first wireless node, an indication of the one or more measurement thresholds.

22. The method of claim 21, wherein one of the one or more measurement thresholds is a reference signal receive power, a variation over time of a reference signal receive power or a channel quality indicator, a round trip time, or a combination thereof associated with communications with the first wireless node.

23. The method of claim 20, further comprising:
transmitting signaling, to the first wireless node, activating the UE-specific random access procedure configuration for communicating with the first wireless node.

24. The method of claim 23, wherein transmitting the signaling activating the UE-specific random access procedure configuration further comprises:
transmitting downlink control information, a media access control-(MAC) control element, radio resource control signaling, or a combination thereof.

25. The method of claim 23, further comprising:
receiving, from the first wireless node, a request requesting the UE-specific random access procedure configuration be activated, wherein transmission of the signaling activating the UE-specific random access procedure configuration is based at least in part on the request.

26. The method of claim 20, further comprising:
transmitting an information element in a downlink control information transmission ordering the random access procedure, wherein the information element indicates that the first wireless node should use the UE-specific random access procedure configuration.

27. A first wireless node for wireless communications, comprising:
a memory storing processor-executable code; and
one or more processor coupled with the one or more memories and individually or collectively operable to execute the code to cause the first wireless node to:
receive, from a parent network entity, a system information message that indicates a plurality of random access procedure configurations for performance of a random access procedure between the first wireless node and the parent network entity, the plurality of random access procedure configurations comprising at least a user equipment (UE)-specific random access procedure configuration and a wireless backhaul-specific random access procedure configuration, wherein the first wireless node is a mobile wireless backhaul node to the parent network entity;
select the UE-specific random access procedure configuration based at least in part on the first wireless node being the mobile wireless backhaul node; and
perform the random access procedure with the parent network entity in accordance with the selected UE-specific random access procedure configuration.

28. A parent network entity for wireless communications, comprising:
a memory storing processor-executable code; and
one or more processor coupled with the one or more memories and individually or collectively operable to execute the code to cause the parent network entity to:
transmit, to a first wireless node, a system information message that indicates a plurality of random access procedure configurations for performance of a random access procedure between the parent network entity and the first wireless node, the plurality of random access procedure configurations comprising at least a user equipment (UE)-specific random access procedure configuration and a wireless backhaul-specific random access procedure configuration, wherein the first wireless node is a mobile wireless backhaul node to the parent network entity; and
perform the random access procedure with the first wireless node in accordance with the UE-specific random access procedure configuration based at least in part on the first wireless node being the mobile wireless backhaul node.

\* \* \* \* \*